United States Patent
Yamane et al.

[11] Patent Number: 6,140,931
[45] Date of Patent: Oct. 31, 2000

[54] SPINDLE STATE DETECTOR OF AIR BEARING MACHINE TOOL

[75] Inventors: Yasuo Yamane, Hiroshima; Masahiko Fukuta, Numazu; Takao Date, Tagata-gun; Satoshi Kumamoto, Mishima, all of Japan

[73] Assignee: Toshiba Kikai Kabushiki Kaisha, Tokyo, Japan

[21] Appl. No.: 09/229,322

[22] Filed: Jan. 13, 1999

[30] Foreign Application Priority Data

| Jan. 13, 1998 | [JP] | Japan | 10-004824 |
| Jan. 13, 1998 | [JP] | Japan | 10-004825 |
| Jan. 13, 1998 | [JP] | Japan | 10-004826 |

[51] Int. Cl.[7] ................... G08B 21/00
[52] U.S. Cl. .......... 340/686.6; 340/680; 318/571
[58] Field of Search ............... 340/680, 686.6; 318/571; 408/5, 6, 8, 10, 11, 12, 16; 384/100, 109, 114

[56] References Cited

U.S. PATENT DOCUMENTS

| 3,818,334 | 6/1974 | Rosenberg | 340/680 X |
| 4,353,018 | 10/1982 | Kohzai et al. | 318/571 |
| 4,617,635 | 10/1986 | Shimizu | 318/571 X |
| 5,783,887 | 7/1998 | Veyama et al. | 310/90.5 |
| 5,877,408 | 3/1999 | Shiozaki et al. | 73/37.5 |

Primary Examiner—Thomas Mullen
Attorney, Agent, or Firm—Pillsbury Madison & Sutro LLP

[57] ABSTRACT

An electric path (E) is formed by connecting a spindle (11), a tool (12), a table (4), a base (2), a column (5) and a housing (13) including a capacitor (C0) having the spindle (11) and the housing (13) as electrodes, and electric current is sent to the electric path (E) by a current generator (51). An electro-capacitance change is detected by measuring a current value in the electric path (E) by an electro-capacitance detector (52) to detect a state of a bearing gap between the spindle (11) and the housing (13). No multiple sensors are necessary and the spindle state detector (50) can be simplified.

17 Claims, 15 Drawing Sheets

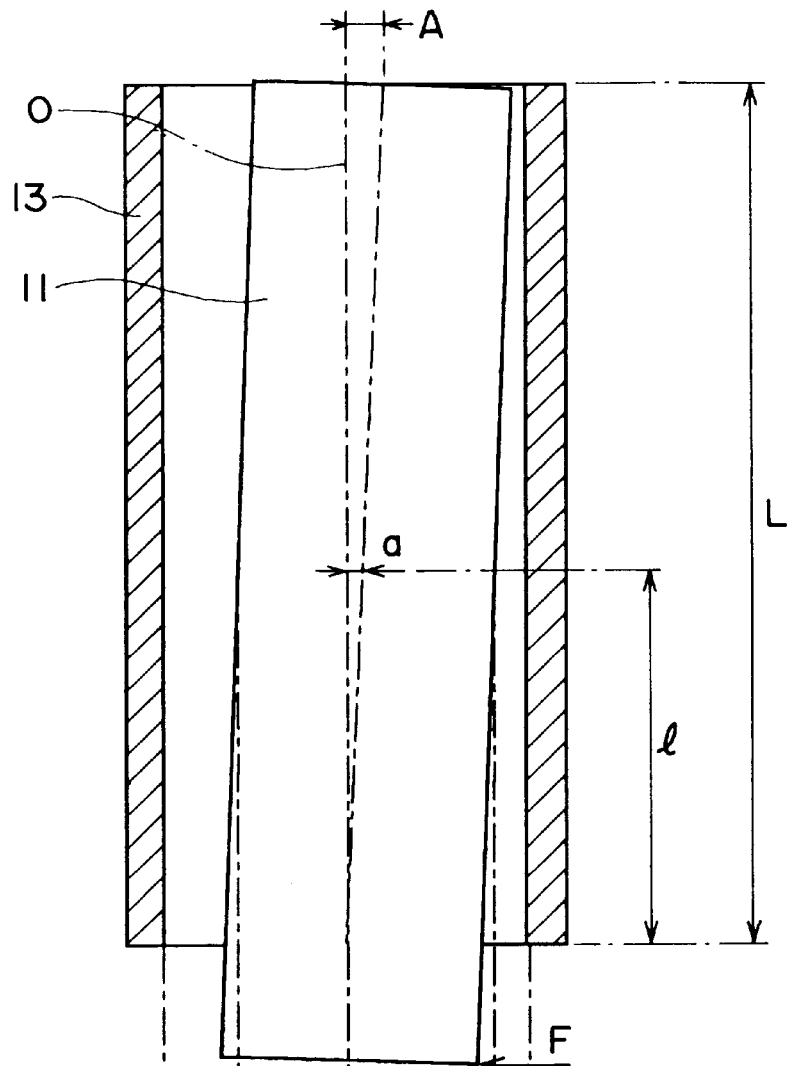
F I G. 1(A)
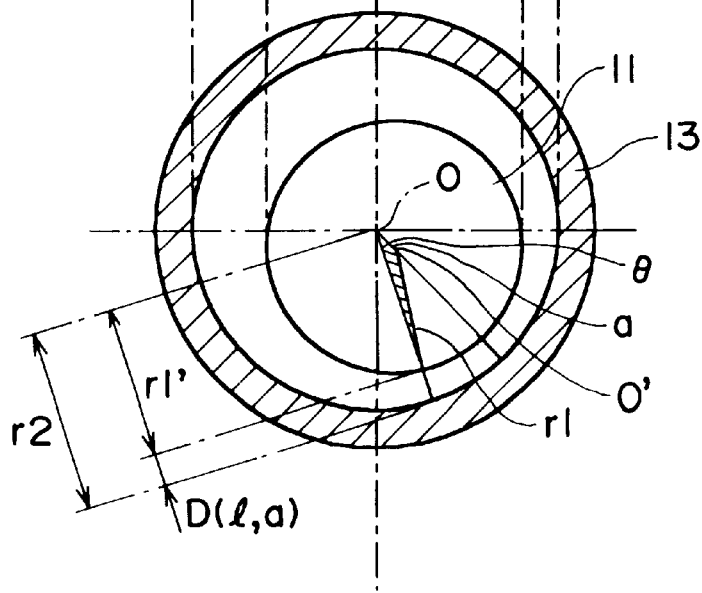
F I G. 1(B)

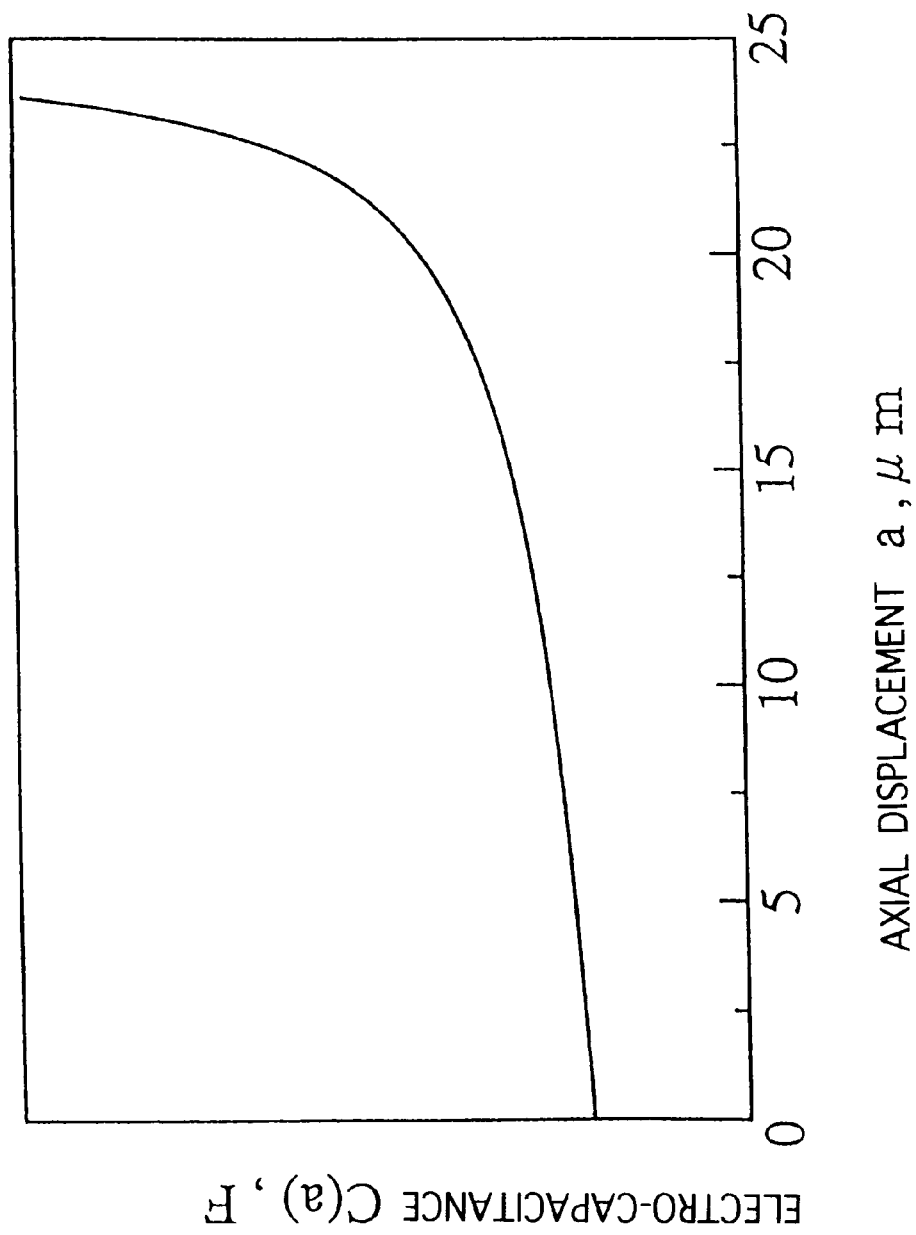
F I G. 2

F I G. 3
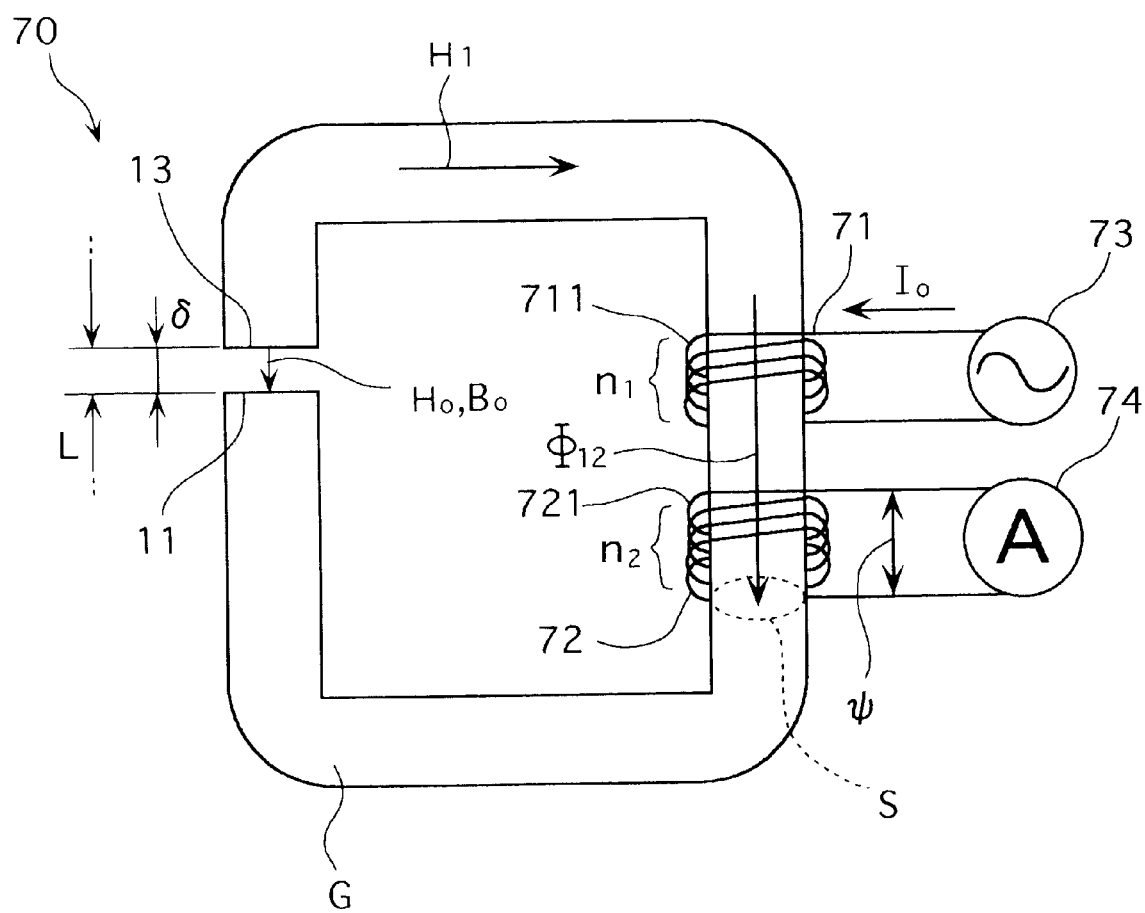

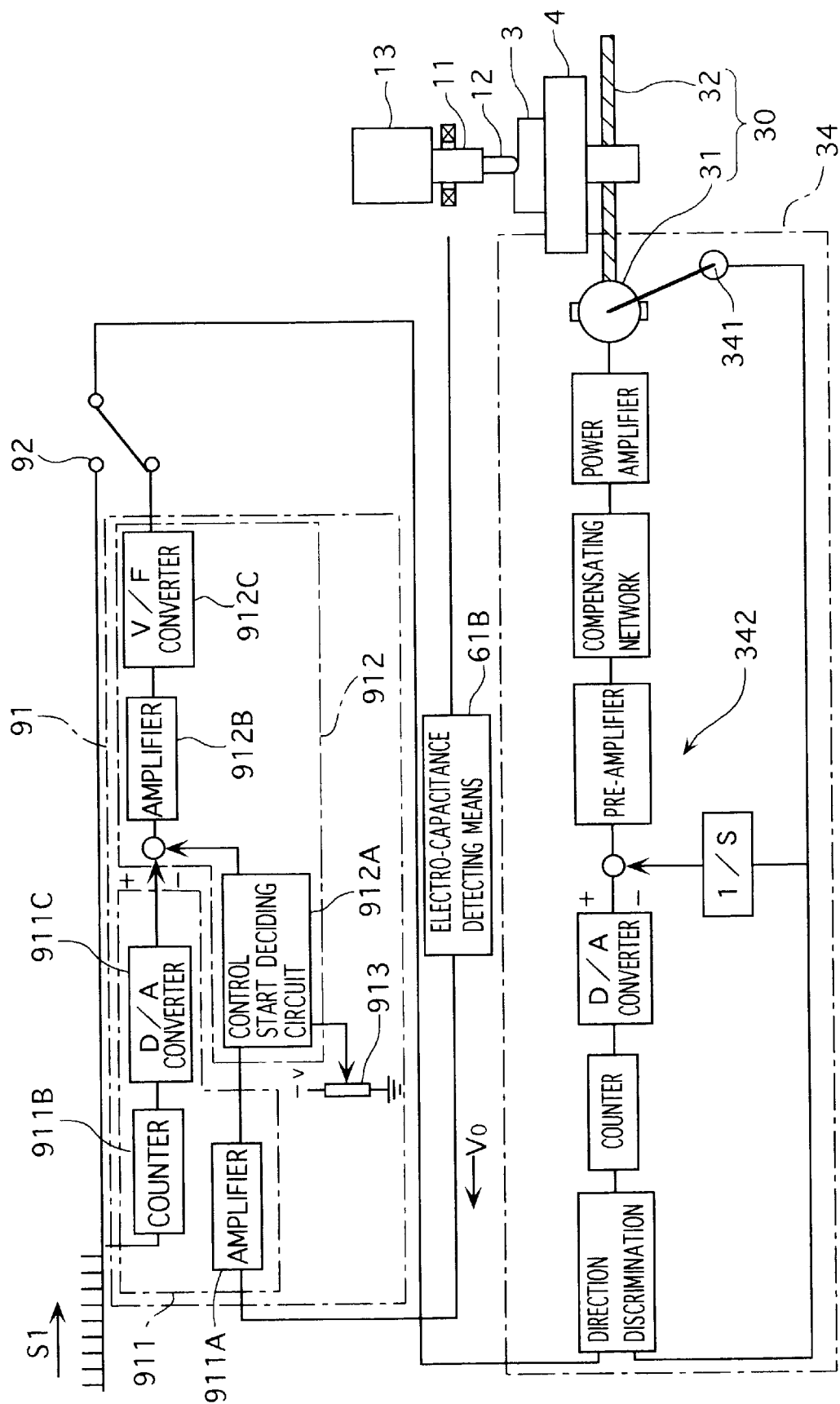

SPINDLE STATE DETECTOR OF AIR BEARING MACHINE TOOL

BACKGROUND OF THE INVENTION

1. Field of the Invention

The present invention relates to a spindle state detector of an air bearing machine tool which is installed on a machine tool of which spindle is supported by an air bearing to detect a bearing gap state between the spindle and the housing which is a bearing portion of the air bearing, and a contact avoidance controller of the air bearing machine tool for avoiding a contact between the spindle and the housing. The present invention can be applied for conducting relatively high-load cutting process using a machine tool of which spindle is supported by a static-pressure air bearing.

2. Description of Related Art

Conventionally, a machine tool is used for cutting a metal material and the like. The machine tool cuts the metal material and the like by rotating a cutting tool together with the spindle, such as an end mill and a milling cutter attached to a spindle rotatably supported.

As the machine tool, a static-air bearing machine tool of which spindle is supported by a housing by a static-air bearing is known. According to the static-air bearing machine tool, since the spindle is supported by a compressed air layer provided between the housing as a bearing portion and the spindle, a friction between the spindle and the housing is diminished, thereby rotating the spindle at a high-speed to speed up cutting process.

[Spindle Displacement Problem of the Static-air bearing Machine Tool]

Sometimes, a great load is applied to the spindle of the static-air bearing machine tool during the cutting process. In this case, since the spindle is supported by the compressed air layer having elasticity, the spindle can be shifted from an original rotation axis by the load. When a displacement of the rotation axis gets larger, the spindle and the housing come into contact causing damage such as a seizure. Such a damage can be a fatal trouble of a machine tool.

Accordingly, the static-air bearing machine tool must be used under a condition where the spindle and the housing do not contact with each other. However, the condition has to be set so as to be safe to operate the static-air bearing machine tool, yet considering the fluctuation range of it, since the load applied to the spindle always fluctuates. In this case, full ability of the machine tool can not be utilized.

In solving the above problem, an alarm system and a contact avoidance controller are strongly desired, where a relative displacement of the spindle and the housing, i.e., a gap between the spindle and the housing during the rotation of the spindle is always monitored to transmit a danger signal when possible contact is predicted, or where the contact is positively avoided.

[Detection of the Spindle State]

A sensor which can precisely detect the relative displacement between the spindle and the housing without making contact with each other is necessary for continuously surveying the gap between the spindle and the housing.

As a sensor for detecting the relative displacement between the spindle and the housing, without making contact with each other an eddy current type, electro-capacitance type and laser-beam type sensor are known.

However, all of such conventional sensors can detect a displacement only in a single axial direction. Accordingly, multiple sensors have to be provided to monitor the movement of the spindle when the spindle as a target of the monitor is moved in three dimensions.

In other words, according to the conventional sensors when a spindle 11 is moved three-dimensionally relatively to a housing 13 by an external force F as shown in FIG. 17, a total of five sensors composed of a set of sensors Sx, Sy and Sz for respectively measuring a relative position of the housing 13 and the spindle 11 in the X, Y and Z-axis direction and another set of sensors Sa and Sb for measuring an inclination of the spindle 11 relative to the housing 13 together with the sensors Sx and Sy, have to be used to monitor the three-dimensional movement of the spindle 11.

Accordingly, multiple sensors have to be disposed in the static-air bearing machine tool to construct a system for monitoring the movement of the spindle to avoid contact. Therefore, the system is complicated.

Furthermore, since the system is complicated, it is difficult to newly introduce the system to a static-air bearing machine tool having no surveillance system.

[Contact Avoidance of the Spindle]

On the other hand, a contact avoidance controller having a detecting means for detecting the relative displacement of the spindle and the housing by a sensor and a controlling means for stopping a feed of the spindle when the detected relative displacement of the spindle and the housing is below a predetermined level is conventionally known as contact avoidance controller for avoiding the contact between the spindle and the housing in advance.

When the spindle and the housing are about to contact, the contact avoidance controller stops feeding the spindle or a table onto which a work is put. Accordingly, the load applied to the spindle is lessened to return the spindle to an original rotation axis.

The eddy current type, electro-capacitance type and laser-beam type sensors are used as sensors for the contact avoidance controller.

However, the following disadvantages are caused by the contact avoidance controller of the static-pressure air-bearing machine tool:

(1) The conventional contact avoidance controller only can stop the feed of the spindle or the table. Accordingly, the processing of the work is stopped during the control by the controller, thereby deteriorating processing efficiency of the machine tool; and (2) Since the sensor of the conventional contact avoidance controller can only detect a displacement in one axis direction, two sensors for measuring the inclination of the spindle as well as sensors for measuring X, Y and Z-axis displacement are necessary when the measured spindle is moved in three dimensions, thereby complicating a structure of the detecting means.

SUMMARY OF THE INVENTION

[Detecting Spindle State]

An object of the present invention is to provide a spindle state detector of an air bearing machine tool which can detect a contact state of a spindle and a housing with a simple structure.

In the present invention, the following methods are taken for attaining the above object of the present invention: (1) regarding the spindle and the housing as a capacitor to detect an electro-capacitance therebetween, (2) regarding the spindle and an electrode provided to the housing as a capacitor to detect an electro-capacitance therebetween, and (3) regarding the spindle and the housing as a sequential magnetic core to detect a magnetic flux thereinside.

(Detecting Principle of Electro-Capacitance Type)

The electro-capacitance type (1) and (2) are based on the following idea.

Generally speaking, the electro-capacitance C of a flat capacitor can be expressed as following formula (1) ($\epsilon$:

permittivity between electrodes, S: size of flat surface, d: distance between the flat surface).

$$C = \varepsilon \frac{S}{d} \tag{1}$$

As shown in FIG. 1, the cylindrical spindle 11 and a pipe-shaped housing 13 form a cylindrical capacitor having a pair of electrodes constituted by mutually opposing surfaces. Supposing the electro-capacitance of the cylindrical capacitor is the sum of electro-capacitance of infinitesimal flat capacitors, the electro-capacitance dC of infinitesimal interval divided around a rotation axis O of the spindle 11 and in an axial direction thereof can be represented as following formula (2).

$$dC = \varepsilon \frac{dS}{D(l, a)} \tag{2}$$

$$dS = r2d\,\theta dl$$

$$\therefore\ dC = \varepsilon \frac{r2d\,\theta dl}{D(l, a)}$$

D(l,a): Distance between flat surfaces (between the spindle 11 and the housing 13) when the cylindrical capacitor is divided into flat capacitors.

dθ: infinitesimally divided angle around the rotation axis O when the cylindrical capacitor is divided into flat capacitors.

dl: infinitesimal division length along the rotation axis direction.

Accordingly, the electro-capacitance C of the entire cylindrical capacitor is calculated as an integration value of dθ of divided angle around the rotation axis O of the cylinder and dl of height dimension of the cylinder of the formula (2), which is expressed as following formula (3).

$$C(a) = \int dC = \int_0^L \int_0^{2\pi} \frac{\varepsilon r2}{D(l, a)} d\theta dl = 2\varepsilon \int_0^L \int_0^{\pi} \frac{r2}{D(l, a)} d\theta dl \tag{3}$$

The distance D(l,a) between the flat surfaces can be calculated as follows.

As shown in FIG. 1(B), when the inside diameter of the housing 13 is expressed as r2, outside diameter of the spindle 11 is expressed as r1, a distance from the rotation axis O along the diameter r2 direction of the housing 13 to outer surface of the spindle 11 is expressed as r1' and a displacement of the rotation axis from the rotation axis O of the height dimension l toward the axis center O' of the spindle 11 is expressed as a, relationship of following formula (4) can be derived in a triangle composed of r1', r1 and a from law of cosines.

$$r1^2 = a^2 + r1'^2 + 2a \times r1' \times \cos\theta$$

$$\therefore\ r1' = a \times \cos\theta + \sqrt{(a \times \cos\theta)^2 + r1^2 - a^2} \tag{4}$$

As shown in FIG. 1(A), the displacement of the rotation axis a can be expressed as a function of height dimension l from an end of the spindle 11 using a height dimension L of the spindle 11 and a maximum displacement of the rotation axis A of base end of the spindle 11, which is represented as following formula (5):

$$a = \frac{A}{L} \times l \tag{5}$$

The distance between the flat surfaces D(l,a) is expressed as a difference r2−r1' (r2: inside diameter; r1': distance). Accordingly, r2/D(l,a) of the formula (3) can be modified as following formula (6).

$$\frac{r2}{D(l, a)} = \tag{6}$$

$$\left[1 - \frac{r1'}{r2}\right]^{-1} = \left[1 - \left\{\frac{a}{r2}\cos\theta + \sqrt{\left(\frac{a}{r2}\cos\theta\right)^2 - \left(\frac{a}{r2}\right)^2 + \left(\frac{r1}{r2}\right)^2}\right\}\right]^{-1}$$

Actually, the gap between the spindle 11 and the housing 13 is very small and the displacement of the rotation axis a is sufficiently small relative to the inside diameter r2. Accordingly, the formula inside the square root of formula (6) can be approximated as following formula (7).

$$\left(\frac{a}{r2}\cos\theta\right)^2 - \left(\frac{a}{r2}\right)^2 + \left(\frac{r1}{r2}\right)^2 = -\left(\frac{a}{r2}\sin\theta\right)^2 + \left(\frac{r1}{r2}\right)^2 \rightarrow \left(\frac{r1}{r2}\right)^2 \because r2 \gg a \tag{7}$$

Accordingly, the formula (6) is modified as following formula (8).

$$\frac{r2}{D(l, a)} = \frac{r2}{r2 - r1 - a \times \cos\theta} \tag{8}$$

By incorporating the above formula (8) into the formula (3), the electro-capacitance C of the cylindrical capacitor is expressed as a function of the displacement of the rotation axis a, which is expressed as following formula (9).

$$C(a) = 2\varepsilon \int_0^L \int_0^{\pi} \frac{r2}{D(l, a)} d\theta dl \tag{9}$$

$$= 2\varepsilon \int_0^L \int_0^{\pi} \frac{r2}{r2 - r1 - a \times \cos\theta} d\theta dl$$

The formula (9) is represented as a graph shown in FIG. 2.

Accordingly, an electro-capacitance threshold value Co can be defined by the formula (9) or FIG. 2 in accordance with a limit value Ao of the displacement of the rotation axis defined so that the spindle 11 and the housing 13 do not contact with each other.

When the limit value Ao of the displacement of the rotation axis is detected by the electro-capacitance between the spindle and an electrode disposed adjacent to a distal portion of the spindle, a threshold value Co' relative to a limit value Ao of the displacement of the rotation axis can be set in the same manner as described above, considering a ratio between the electrode height dimension L' and entire length of the spindle L.

(Arrangement of Electro-Capacitance Type-Housing Electrode)

According to the above principle, following specific arrangement is adopted in the present invention.

A spindle state detector of an air bearing machine tool according to the present invention is installed to a machine tool of which spindle is supported by a housing using an air bearing to detect a state of a bearing gap between the spindle and the housing. The spindle state detector has a capacitor having a pair of electrodes constituted of mutually opposing portions of the spindle and the housing and an electro-capacitance detector for detecting an electro-capacitance of the capacitor, and a relative displacement of the spindle and the housing is detected by a change in the electro-capacitance of the capacitor.

More specifically, in the above-described spindle state detector, the spindle state detector of the air bearing machine tool may further have an electric path connecting the spindle, a tool attached to a distal end of the spindle, a work abutted to the tool, and the housing, the electric path including the capacitor therein and a current generator for generating an electric current in the electric path. The current generator can generate the current in the electric path, and the electro-capacitance detector can detect the current in the electric path to detect the change in the electro-capacitance of the capacitor.

The current generator of the spindle state detector of the air bearing machine tool may have an excitation coil including a magnetic core encircling the spindle and a winding wound to the magnetic core, and the electro-capacitance detector may have a detection coil including another magnetic core encircling the spindle and another winding wound to the magnetic core.

The spindle state detector of the air bearing machine tool preferably has a determining means for alarming when the electro-capacitance detected by the electro-capacitance detector exceeds a predetermined threshold value.

According to the above arrangement, the relative displacement of the spindle and the housing can be detected to detect a gap condition between the spindle and the housing only by detecting the electro-capacitance of the capacitor having the spindle and the housing as electrodes.

Accordingly, as described in the background section, the three-dimensional movement of the spindle can be monitored by a simple structure without disposing multiple sensors, thereby avoiding the contact between the spindle and the housing.

The monitoring system can be easily installed to the air bearing machine tool only by connecting the spindle, the tool, the work and the housing to form the electric path and by attaching the current generator and the electro-capacitance detector.

Since the current generator has the excitation coil, the current can be sent without making contact in the electric path by using electromagnetic induction. Similarly, since the electro-capacitance detector has the detection coil, the current value in the electric path can be measured without making contact.

Accordingly, the electro-capacitance of the capacitor can be measured without making contact, thereby enabling the construction of the monitoring system independently of the air bearing machine tool to improve an applicability of the spindle state detector largely.

Further, when a determining means based on the threshold value is provided and the air bearing machine tool is controlled by NC apparatus (numerical control apparatus), a control signal for stopping the machine tool etc. can be outputted to the NC apparatus, thereby facilitating automation of the air bearing machine tool.

(Electro-Capacitance—Independent Electrode Type Arrangement)

The following alternate specific arrangement can be adopted for the electro-capacitance type.

A spindle state detector of an air bearing machine tool according to the present invention is installed in a machine tool whose spindle is supported by a housing using an air bearing to detect a state of a bearing gap between the spindle and the housing. The spindle state detector has first electrode attached to the housing, opposing the spindle by a predetermined space and electrically insulated from the housing, first capacitor formed of the first electrode and a part of the spindle opposing the first electrode and an electro-capacitance detector for detecting an electro-capacitance of the first capacitor. The spindle status detector detects a relative displacement of the spindle and the housing by a change in the electro-capacitance of the first capacitor.

The above-described spindle state detector of the air bearing machine tool may preferably has second electrode attached to the housing, opposing the spindle by a predetermined space and electrically insulated from both of the housing and the first electrode and second capacitor formed of the second electrode and a portion of the spindle opposing the second electrode. In this case, the first capacitor and the second capacitor are preferably mutually serial-connected through the spindle, and the electro-capacitance detector preferably has a bridge circuit including the first capacitor and the second capacitor.

Alternatively, the housing of the spindle state detector of the air bearing machine tool may be electrically insulated from a body of the air bearing machine tool, and a third capacitor having a pair of electrodes constituted of mutually opposing portions of the spindle and the housing may be provided.

The first capacitor and the third capacitor are preferably mutually serial-connected through the spindle, and the electro-capacitance detector preferably has a bridge circuit including the first capacitor and the third capacitor.

The third capacitor here is the same as the capacitor mentioned in the above housing-electrode type section.

Incidentally, when the electro-capacitance of respective capacitors are detected, an electric path including respective capacitors is preferably formed to excite the current therein. For the electric path, the above-described electric path mentioned in the housing electrode type section can be employed.

The spindle state detector of the air bearing machine tool according to the present invention preferably has a determining means for alarming when the electro-capacitance detected by the electro-capacitance detector exceeds a predetermined threshold value.

According to the above arrangement, the relative displacement of the spindle and the housing can be detected to detect a gap state between the spindle and the housing only by detecting the electro-capacitance of the capacitor constituted of the electrode attached to the housing and the spindle.

Accordingly, as described in the background section, the three-dimensional movement of the spindle can be monitored by a simple structure without disposing multiple sensors, thereby avoiding the contact between the spindle and the housing.

Further, since the relative displacement is detected by the electrode electrically insulated from the housing, the system can be installed easily irrespective of the structure of the air bearing machine tool.

Since the electro-capacitance detector has two capacitors such as the first and the second or the first and the third and a bridge circuit including the two capacitors, the detection can be conducted more precisely.

In other words, since the gap between the spindle and the housing is set small in the above-described air bearing machine tool, the changing amount of the gap is also small so that the change of the electro-capacitance detected by the cylindrical capacitor becomes small. The change in the electro-capacitance can be clearly confirmed by detecting the change in the electro-capacitance of the capacitor using the voltage balance of the bridge circuit.

Accordingly, the displacement of the rotation axis, i.e., the relative displacement of the spindle and the housing can be detected highly accurately by arranging the two capacitors as an impedance of the bridge circuit and detecting the voltage balance of the bridge circuit.

When the machine tool body and the housing can be electrically insulated, the third capacitor having the housing as the electrode thereof can be used, so that the arrangement can be simplified as compared to using the second electrode since the housing is used as the electrode.

On the other hand, when the machine tool body and the housing cannot be electrically insulated, the second capacitor using the second electrode can be employed. The high precision by the bridge circuit can be obtained in the arrangement too.

When the air bearing machine tool is controlled by the NC apparatus (numerical control apparatus) and the like, the determining means based on the threshold value allows to output the control signal to stop the machine tool to the NC apparatus, thereby facilitating the automation of the air bearing machine tool.

(Principle of Magnetic Flux Type)

The detecting principle of magnetic flux type (3) is as follows.

In FIG. 3, the magnetic core G is constructed of a connection of, for example, the spindle 11, the tool, the work and the housing 13. The pair of the magnetic pole of the magnetic core G is the spindle 11 and the housing 13 mutually opposing at a bearing gap δ therebetween.

Windings 711 and 721 are wound to the magnetic core G in a coiled fashion spaced apart by a predetermined gap, thus making a magnetic flux generation coil 71 and magnetic flux detection coil 72. A high-frequency current is sent to the magnetic flux generation coil 71 by the alternating current oscillator 73, thereby generating the magnetic flux in the magnetic core G.

When the bearing gap δ between the magnetic poles of the spindle 11 and the housing, an induced electromotive force ψ is generated in the winding 721 by a change in the magnetic flux. Accordingly, the change in the magnetic flux in accordance with the change in the bearing gap δ between the spindle 11 and the housing 13 can be detected by measuring the electromotive force ψ.

Specifically, a magnetic field generated to the gap δ between the spindle 11 and the housing 13 in FIG. 3 can be expressed as following formula (10).

$$H_0 = \frac{B_0}{\mu_0} \tag{10}$$

$H_0$: Strength of magnetic field of the bearing gap
$B_0$: Magnetic flux density of the bearing gap
$\mu_0$: magnetic permeability in vacuum On the other hand, strength of the magnetic field inside the magnetic core G connecting the spindle 11, the tool, the work and the housing 13 can be expressed as following formula (11).

$$H_1 = \frac{B_0}{\mu_0 \mu_r} \tag{11}$$

$H_1$: Strength of magnetic field inside the magnetic core G
$\mu_r$: Magnetic permeability of the magnetic field inside the magnetic core G A line integral of the magnetic field along a central axis of the magnetic core G has a relationship as shown in formula (12) according to Ampere's circuit theory.

$$H_0 \delta + H_1 L = \frac{B_0}{\mu_0}\left(\delta + \frac{L}{\mu_r}\right) = n_1 I_0 \tag{12}$$

δ: Bearing gap between the spindle 11 and the housing 13
L: Path length of the magnetic core G
$n_1$: Winding number of the magnetic flux generation coil 71
$I_0$: Electric current sent in the magnetic flux generation coil 71

Accordingly, the magnetic flux density generated in the gap δ of the spindle 11 and the housing 13 can be calculated as following formula (13).

$$B_0 = \frac{n_1 \mu_r \mu_0 I_0}{\mu_r \delta + L} \tag{13}$$

On the other hand, the magnetic flux generated to the magnetic flux detection coil 72 can be expressed as following formula (14).

$$\Phi_{12} = n_2 B_0 S = \frac{n_1 n_2 \mu_0 I_0}{\mu_r \delta + L} S \tag{14}$$

$\Phi_{12}$: Magnetic flux inside the magnetic core G
$n_2$: Winding number of the detection coil 72
S: Cross section of the magnetic core G When the magnetic flux is changed, an induced electromotive force is generated in the magnetic flux detection coil 72.

The induced electromotive force generated to the magnetic flux detection coil 72 can be expressed as following formula (15) supposing the high-frequency current Io sent in the magnetic flux generation coil 71 is expressed as Io=Asinωt.

$$\psi = -\frac{d\Phi_{12}}{dt} = \frac{n_1 n_2 \mu_0 S}{\mu_r \delta + L} \times \frac{dI_0}{dt} \tag{15}$$

$$= \frac{A\omega n_1 n_2 \mu_r \mu_0 S}{\mu_r \delta + L} \cos \omega t$$

In the above, the relative displacement of the spindle 11 and the housing 13 can be detected by the formula (15) by detecting the induced electromotive force generated to the magnetic flux detection coil 72 by a current sensor 74. Accordingly, the gap state between the spindle 11 and the housing 13 can be detected.

(Arrangement of Magnetic Flux Type)

Based on the above principle, the following specific arrangement is adopted in the present invention.

A spindle state detector of an air bearing machine tool according to the present invention is installed to a machine tool of which a spindle is supported by a housing using an air bearing to detect a state of a bearing gap between the spindle and the housing. The spindle state detector has a magnetic core having a pair of magnetic poles constituted of mutually opposing portions of the spindle and the housing and a magnetic flux detector for detecting a magnetic flux inside the magnetic core. A relative displacement of the spindle and the housing is detected by a change in the magnetic flux of the magnetic core.

More specifically, the spindle state detector of the air bearing machine tool may preferably have a magnetic flux generator for generating the magnetic flux inside the magnetic core. The magnetic flux is generated to the magnetic core by the magnetic flux generator, and an induced electromotive force generated in the magnetic flux detector in accordance with the change in magnetic flux in the magnetic core may preferably be measured to detect the change in the magnetic flux of the magnetic core.

In the spindle state detector of the air bearing machine tool, the magnetic flux generator preferably has a magnetic flux generating coil including a winding wound to the magnetic core in a coiled fashion by a predetermined gap therebetween, and the magnetic flux detector preferably has a magnetic flux detection coil including another winding wound to the magnetic core in a coiled fashion by a predetermined gap therebetween.

More preferably, the spindle state detector of the air bearing machine tool has a determining means for alarming when the electro-capacitance detected by the electro-capacitance detector exceeds a predetermined threshold value.

According to the above arrangement, the relative displacement of the spindle and the housing can be detected as the induced electromotive force generated to the magnetic flux detection coil in accordance with the change in the magnetic flux.

Accordingly, the gap state between the spindle and the housing of the air bearing machine tool can be detected by the magnetic core and the coil composed of a winding, thereby simplifying the structure and reducing the production cost of the spindle state detector similarly to the above-described electro-capacitance type.

Further, when a determining means based on the threshold value is provided and the air bearing machine tool is controlled by the NC apparatus (numerical control apparatus), a control signal for stopping the machine tool, etc., can be outputted to the NC apparatus, thereby facilitating automation of the air bearing machine tool.

(Contact Avoidance of the Spindle)

Another object of the present invention is to provide a contact avoidance controller of an air bearing machine tool which can avoid contact between the spindle and the housing without deteriorating processing efficiency of the work and without complicating the structure of the detector.

For attaining the above object, a contact avoidance controller of an air bearing machine tool according to the present invention is for avoiding the contact of a spindle and a housing installed to an air bearing machine tool for cutting a work, the air bearing machine tool having the spindle attached with a rotary tool at an end thereof and the housing for supporting the spindle by an air bearing. The contact avoidance controller has a spindle state detector for detecting a relative displacement of the spindle and the housing and a feed speed controller for changing a relative feed speed of the tool and the work. The contact avoidance controller is characterized in that the relative feed speed of the tool and the work is changed by the feed speed controller in accordance with the relative displacement detected by the spindle state detecting means, thereby keeping the relative displacement within a predetermined range.

According to the above arrangement, the relative displacement of the spindle and the housing can always be monitored during the operation of the air bearing machine tool since the contact avoidance controller has the relative displacement detector. Further, since the feed speed controller is provided, the relative feed speed of the tool and the work can be changed in accordance with the relative displacement detected by the relative displacement detector.

Accordingly, a load applied to the spindle can be controlled by the relative displacement detector and the feed speed controller to conduct processing while keeping the relative displacement within a predetermined range. Therefore, contact between the spindle and the housing can be avoided without deteriorating the processing efficiency of the work.

In the above arrangement, the spindle state detector preferably has a capacitor having a pair of electrodes constituted of mutually opposing portions of the spindle and the housing, and an electro-capacitance detector for detecting the electro-capacitance of the capacitor, to detect the relative displacement of the spindle and the housing by a change in the electro-capacitance of the capacitor.

Alternatively, the spindle state detector may have first electrode attached to the housing, opposing the spindle by a predetermined space from and electrically insulated from the housing, first capacitor constituted of the first electrode and a portion of the spindle opposing the first electrode, and an electro-capacitance detector for detecting the electro-capacitance of the first capacitor to detect the relative displacement of the spindle and the housing by the change in the electro-capacitance of the first capacitor.

Further alternatively, not being restricted to the electro-capacitance type spindle displacement detection, the spindle state detector may have a magnetic core having a pair of magnetic poles constituted of opposing portions of the spindle and the housing and a magnetic flux detector for detecting the magnetic flux inside the magnetic core to detect the relative displacement of the spindle and the housing which is detected by a change in the magnetic flux of the magnetic core.

The detecting principle and the specific structure of the respective spindle displacement detector are the same as the above-described spindle displacement detector. Accordingly, an overlapping description is omitted here.

According to the respective spindle state detectors, the spindle, the housing and the electrodes opposingly disposed to the spindle can be regarded as capacitors to detect the three-dimensional movement of the spindle in the bearing gap between the spindle and the housing. Accordingly, no multiple sensors are necessary to be provided to the machine tool, thereby simplifying the structure of the contact avoidance controller.

Further, since the spindle state detector detects the relative displacement of the spindle and the housing by detecting the electro-capacitance of the spindle and the electrodes or the magnetic flux of the magnetic core, the contact avoidance controller can be easily installed to the machine tool irrespective of the specific structure of the air bearing machine tool.

In the contact avoidance controller of the air bearing machine tool, the feed speed controller preferably has an acquiring section for acquiring a detection signal from the spindle state detector and a signal processor for converting the detection signal acquired by the acquiring portion and for outputting a feed speed control signal for controlling the relative feed speed, and the signal processor preferably has a control start deciding circuit which does not output the feed speed control signal until the detection signal sent from the spindle state detector reaches a predetermined value.

Here, the predetermined value of the detection signal sent from the spindle state detector refers to the value of the detection signal by which the control by the feed speed controller is judged to start when the spindle and the housing approach each other.

In other words, the feeding movement of the air bearing machine tool is conducted just in accordance with a processing program set in the NC apparatus of the machine tool and the like without controlling by the feed speed controller until the bearing gap reaches the predetermined value, since the feed speed controller has the control start deciding circuit.

On the other hand, when the detection signal reaches the predetermined value, the feed speed controller starts to control the relative feed speed of the spindle and the work to lessen the load applied to the spindle to avoid the contact of the spindle and the housing.

BRIEF DESCRIPTION OF THE DRAWINGS

FIG. 1(A) and FIG. 1(B) are views for explaining a detecting principle of electro-capacitance type detector according to the present invention;

FIG. 2 is a graph showing correlation between a displacement of the rotation axis and an electro-capacitance in the detecting principle of the electro-capacitance type detector;

FIG. 3 is a view for explaining a detecting principle of a magnetic flux type detector and the fourth embodiment according to the present invention;

FIG. 12 is a diagram showing a feed speed controller of the fifth embodiment;

DETAILED DESCRIPTION OF PREFERRED EMBODIMENT(S)

A preferred embodiment of the present invention will be described below with reference to drawings.

(1-1) First Embodiment/Electro-Capacitance: Housing Electrode Type

A spindle state detector of electro-capacitance: housing electrode type will be described below as first embodiment.

(1-2) Basic Structure of Machine Tool

Figure 4:
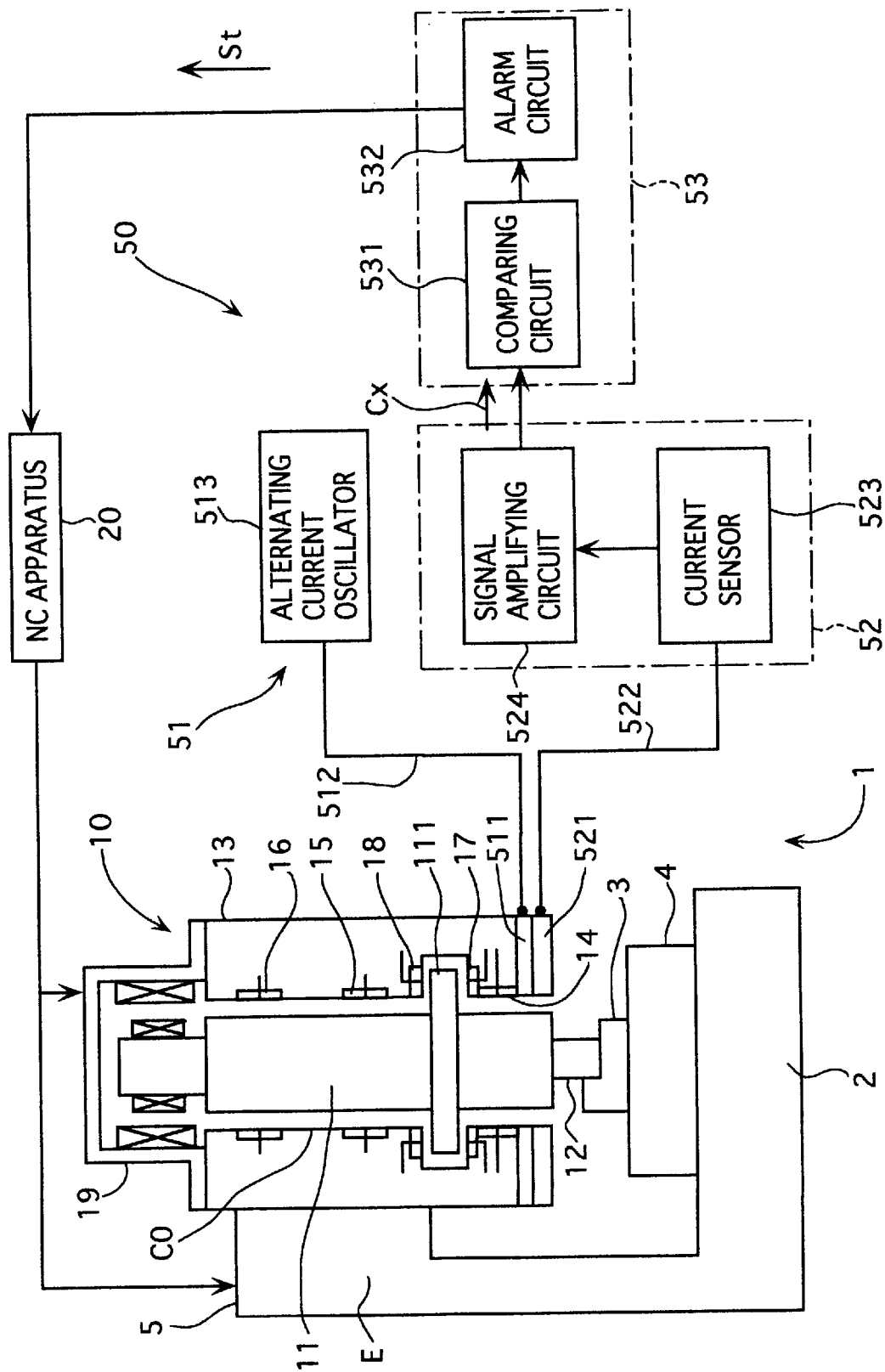
FIG. 4 is a diagram showing an air bearing machine tool having a spindle state detector of the first embodiment according to the present invention.

As shown in FIG. 4, a machine tool 1 of the present embodiment has a table 4 on a base 2 for placing a work 3, and a column 5 on a side of the base 2.

A spindle head 10 is supported by the column 5. A cutting tool 12 is attached on a tip end of a spindle 11 which is rotatably supported by the spindle head 10.

The spindle head 10 has a housing 13 and uses a static-air bearing for supporting the spindle 11.

The spindle 11 has a flange portion 111 in the housing 13. A radial static-air bearing 14 is provided on a part of the housing 13 close to the tool 12 relatively to the flange portion 111, and two radial static-air bearings 15, 16 are provided on the housing 13 oppositely to the air bearing 14 relatively to the flange portion 111. A pair of axial static-air bearings 17 and 18 is provided to the housing 13 respectively positioned oppositely relatively to the flange portion 111. High-pressure air is supplied to the static-air bearings 14 to 18, so that the spindle 11 is floatingly supported by the respective bearings 14 to 18 by a predetermined bearing gap to be rotatably supported in a radial and an axial direction.

A built-in motor 19 is provided to the housing 13 oppositely to the tool 12. The built-in motor 19 rotates the spindle 11. Incidentally, the built-in motor 19 is controlled by a motor driver (not shown) by a movement command from a NC apparatus 20.

The spindle 11 is electrically connected to the housing 13 through the tool 12, the work 3, the table 4, the base 2 and the column 5. Accordingly, an electric path E including a capacitor C0 is formed by electrodes of the spindle 11 and the housing 13 forming the respective bearings 14 to 18.

Incidentally, an insulator 101 (see FIG. 6 and FIG. 10) may be inserted between the spindle head 10 and the column 5 according to some of the following embodiments, thereby electrically insulating the spindle head 10 and the machine tool body formed of the column 5, the base 2 and table 4 and the like.

The spindle head 10 and the table 4 are relatively moved three-dimensionally by a moving mechanism and the like (not shown), so that the tool 12 is abutted to the work 3 to conduct cutting process.

The relative movement is generated by the movement command by the NC apparatus 20. The NC apparatus outputs various movement commands based on a predetermined processing program.

As the moving mechanism, a moving mechanism 30 composed of a DC servomotor 31 and a feed screw 32 is employed as shown in FIG. 12.

The DC servomotor 31 is connected to the NC apparatus 20 through a motor driver 33 (see FIG. 10) for controlling the motor. The motor driver 33 has a servo controller 34 for conducting feed-back control thereinside to control the DC servomotor 31 based on the movement command by the NC apparatus 20.

By the above arrangement, the tool 12 can be moved to touch various parts of the work 3 on the table 4 to cut the work 3.

(1-3) Arrangement of Spindle State Detector

An electro-capacitance detecting spindle state detector 50 including the capacitor C0 formed by the spindle 11 and the housing 13 is provided to the machine tool 1.

The spindle state detector 50 has a current generator 51 for generating electric current in the electric path E, an electro-capacitance sensor 52 for detecting the electro-capacitance of the capacitor C0, and a determining means 53 for determining the state of the bearing gap between the spindle 11 and the housing 13 based on the electro-capacitance detected by the electro-capacitance sensor 52.

The current generator 51 and the electro-capacitance sensor 52 will be described below with reference to FIG. 4 and FIG. 5.

The current generator 51 has a ring-shaped excitation coil 511 surrounding and spaced apart from a distal part of the spindle 11, a winding 511B wound to a magnetic core 511A of the excitation coil 511, and an alternating current oscillator 513 connected to an end of the winding 511B through a cable 512.

The electro-capacitance sensor 52 has a detection coil 521 surrounding and spaced apart from a distal part of the spindle 11, a winding 521B wound to a magnetic core 521A of the detection coil 521, a current sensor 523 connected to an end of the winding 521B through a cable 522, and a signal amplifying circuit 524 for amplifying an output signal of the current sensor 523. Incidentally, the electro-capacitance sensor 52 may be a differential amplifying type where the winding 521B is wound from an intermediate position thereof and inversely right and left, and where a difference in voltage between respective ends of the winding 521B is detected. Accordingly, an output signal of different polarity can be obtained from the respective windings wound inversely right and left. By composing the output signals, double signal output can be obtained. Accordingly, a minute change can be easily detected without any amplifier.

The determining means 53 is composed of a comparing circuit 531 and an alarm circuit 532. Though not shown in FIG. 4, the comparing circuit 531 has an acquiring section for acquiring an output signal Cx outputted from the electro-capacitance sensor 52, a memory section for calculating and memorizing a threshold value Co in accordance with a processing condition of the machine tool 1 using the numerical formula (9) based on a limit value Ao of the displacement of the rotation axis defined so that the spindle 11 and the housing 13 do not contact, and an arithmetic section for comparing the output signal Cx from the acquiring section and the threshold value Co.

A result of the comparison by the arithmetic section is sent to the alarm circuit 532. When the output signal Cx exceeds the threshold value Co, the alarm circuit 532 outputs a control signal ST to the NC apparatus 20 to stop the spindle 11.

Figure 5:
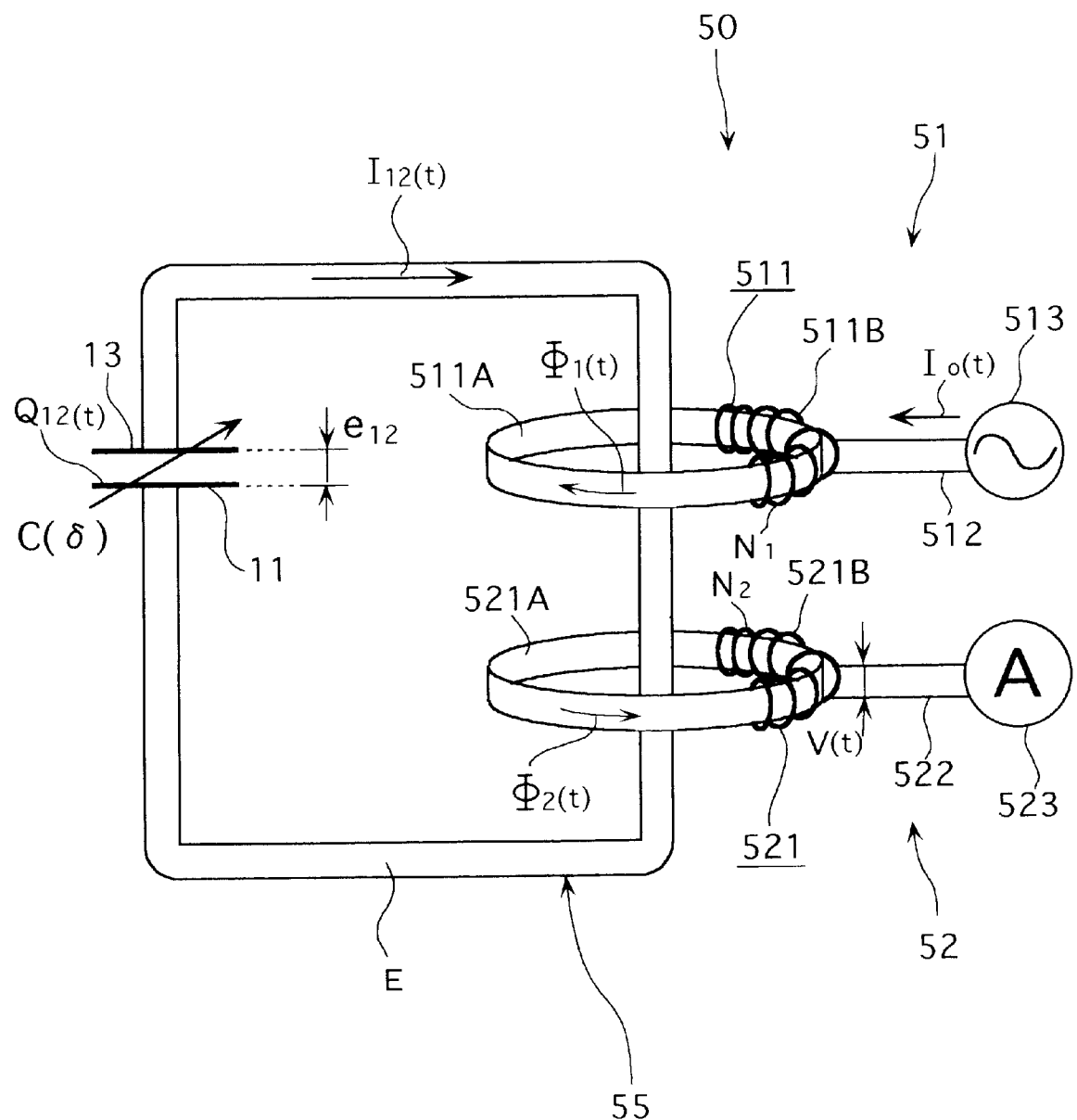
FIG. 5 is a diagram showing an equivalent circuit of the first embodiment and the spindle state detector of the first embodiment.

(1-4) Relationship between Induced Electromotive Force V(t) and Electro-Capacitance Output Signal Cx The air bearing machine tool 1 and the spindle state detector 50 can be regarded as a coupling coil 55 which connects the excitation coil 511 and the detection coil 521 by the electric path E, which can be represented as an equivalent circuit shown in FIG. 5.

In the equivalent circuit of FIG. 5, a magnetic flux of a magnetic field generated when a high-frequency current is sent through the excitation coil 511 can be calculated as following numerical formula (16).

$H_1(t) = N_1 I_0(t)$ $B_1(t) = \mu_1 H_1(t)$ $\Phi_1(t) = B_1(t) S_1$ $$\therefore \Phi_1(t) = N_1 \mu_1 S_1 I_0(t) \tag{16}$$

$I_0(t)$: Current of the excitation coil 511
$H_1(t)$: Magnetic intensity of the excitation coil 511
$\Phi_1(t)$: Magnetic flux of the excitation coil 511
$\mu_1$: Magnetic permeability of the excitation coil 511
$N_1$: Winding number of the excitation coil 511
$S_1$: Cross section of the excitation coil 511

The electromotive force generated by the magnetic flux change of the excitation coil 511 to the coupling coil 55 can be expressed as following numerical formula (17).

$$e_{12}(t) = -\frac{d\Phi_1(t)}{dt} \tag{17}$$

$e_{12}(t)$: Electromotive force generated in the coupling coil 55

Accordingly, the current sent in the coupling coil 55 can be calculated by the following formula (18).

$Q_{12}(t) = C(\delta) e_{12}(t)$ $Q_{12}(t)$: Electric charge of the capacitor C1
$C(\delta)$: Electro-capacitance of the capacitor C1

$$I_{12}(t) = \frac{dQ_{12}(t)}{dt} = C(\delta)\frac{de_{12}(t)}{dt} \tag{18}$$

$$= C(\delta) \times \frac{d}{dt}\left(\frac{d\Phi_1(t)}{dt}\right)$$

$$= C(\delta) N_1 \mu_1 S_1 \frac{d^2 I_0(t)}{dt^2}$$

On the other hand, the magnetic flux generated to the detection coil 521 can be calculated by the following numerical formula (19).

$$\oint_C B_2(t) ds = \mu_2 I_{12}(t)$$

$$2\pi R_2 B_2(t) = \mu_2 I_{12}(t)$$

$B_2(t)$: Magnetic flux density of the detection coil 521
$\mu_2$: Magnetic permeability of the detection coil 521
$R_2$: Toric radius of the detection coil 521
$S_2$: Cross section of the detection coil 521

$$\therefore \Phi_2(t) = B_2(t) S_2 = \frac{\mu_2 S_2}{2\pi R_2} I_{12}(t) \tag{19}$$

Therefore, the induced electromotive force generated to the detection coil 521 can be calculated by the following formula (20).

$$V(t) = -N_2 \frac{d\Phi_2(t)}{dt} (N_2 : \text{Winding number of the detection coil 521}) \tag{20}$$

-continued $$= C(\delta)\frac{N_1 N_2 \mu_1 \mu_2 S_1 S_2}{2\pi R_2} \times \frac{d^3 I_0(t)}{dt^3}$$

The winding number, the magnetic permeability and the cross section of the magnetic core of the excitation coil 511 and the detection coil 521 are fixed as long as they are not changed. And the current Io(t) in the excitation coil 511 is determined by a frequency and a current of the alternating current oscillator 513. Accordingly, the numerical formula (20) can be transformed into following formula (21).

$$V(t)=KC(\delta) \text{ (K: a constant)} \tag{21}$$

As shown above, the electro-capacitance between the spindle 11 and the housing 13 is in proportion to the induced electromotive force detected by the detection coil 521. By measuring a current value generated in the winding 521B by an induced electromotive force generated on to the detection coil 521 using the current sensor 523, a change in the electro-capacitance with the change in the bearing gap between the spindle 11 and the housing 13 can be detected.

Therefore, by detecting the induced electromotive force caused to the detection coil 521 using the current sensor 523, the electro-capacitance of the capacitor C0 can be measured by the numerical formula (21).

(1-5) Setting and Operation of the First Embodiment

A setting and an operation of the above-described spindle state detector 50 will be described below.

(1) The limit value Ao is determined based on a rotation speed of the spindle 11 of the machine tool 1, a feed speed of the table 4, etc., and is inputted to the determining means 53.

(2) The work 3 is put on the table 4 and the machine tool 1 is operated. And the alternating current generator 513 of the current generator 51 is switched on to send the current to the electric path E.

(3) During processing, the electro-capacitance detector 52 measures the current value sent to the winding 521A of the detection coil 521 using the current sensor 523, thereby detecting the induced electromotive force generated on to the detection coil 521. The induced electromotive force is amplified by the signal amplifying circuit 524 and the electro-capacitance of the capacitor C0 is calculated by above-described formula (21) to be outputted to the comparing circuit 531 of the determining means 53 as the output signal Cx.

(4) The output signal Cx and the threshold value Co calculated by the limit value Ao of the displacement of the rotation axis are compared by the comparing circuit. When the output signal Cx exceeds the threshold value Co, the control signal ST is outputted to the NC apparatus 20 by the alarm circuit 532 to stop the rotation of the spindle 11.

(1-6) Effect of First Embodiment

According to the above-described first embodiment, the following effect can be obtained.

Since the capacitor C0 having the spindle 11 and the housing 13 as electrodes is incorporated to the electric path E connecting the spindle 11, the tool 12, the work 3 and the housing 13, a relative displacement δ of the spindle 11 and the housing 13 and a displacement of the rotation axis of the spindle 11 can be detected thereby detecting a gap state between the spindle 11 and the housing 13.

Accordingly, there is no need for multiple sensors to be disposed. The three-dimensional movement of the spindle can be monitored with a simple structure, and the contact of the spindle 11 and the housing 13 can be prevented.

The above arrangement is possible only by structuring the electric path E by connecting the spindle 11, the tool 12, the work 3 and the housing 13, and by attaching the current generator 51 and the electro-capacitance detector 52. Accordingly, the monitoring system can be easily assembled with the air bearing machine tool 1.

Since the current generator 51 has the excitation coil 511, the current can be sent to the electric path E without making contact by virtue of electromagnetic induction.

Similarly, since the current generator 52 has the detection coil 521, the current can be sent to the electric path E without making contact by virtue of electromagnetic induction.

Accordingly, the electro-capacitance of the capacitor C0 can be detected without making contact, thereby assembling the monitoring system independently of the air bearing machine tool 1. Therefore, the spindle state detector 50 can be applied to various machine tools.

Since the determining means 53 is provided, when the air bearing machine tool 1 is controlled by the NC apparatus 20 and the like, the control signal ST for stopping the machine tool 1 in accordance with the gap state of the spindle 11 and the housing 13 can be outputted to the NC apparatus 20, thereby facilitating automation of the air bearing machine tool 1.

(2-1) Second Embodiment/Electro-capacitance: Independent Electrode and Housing Electrode Type A spindle state detector of electro-capacitance-independent electrode type will be described below as second embodiment of the present invention.

Figure 6:
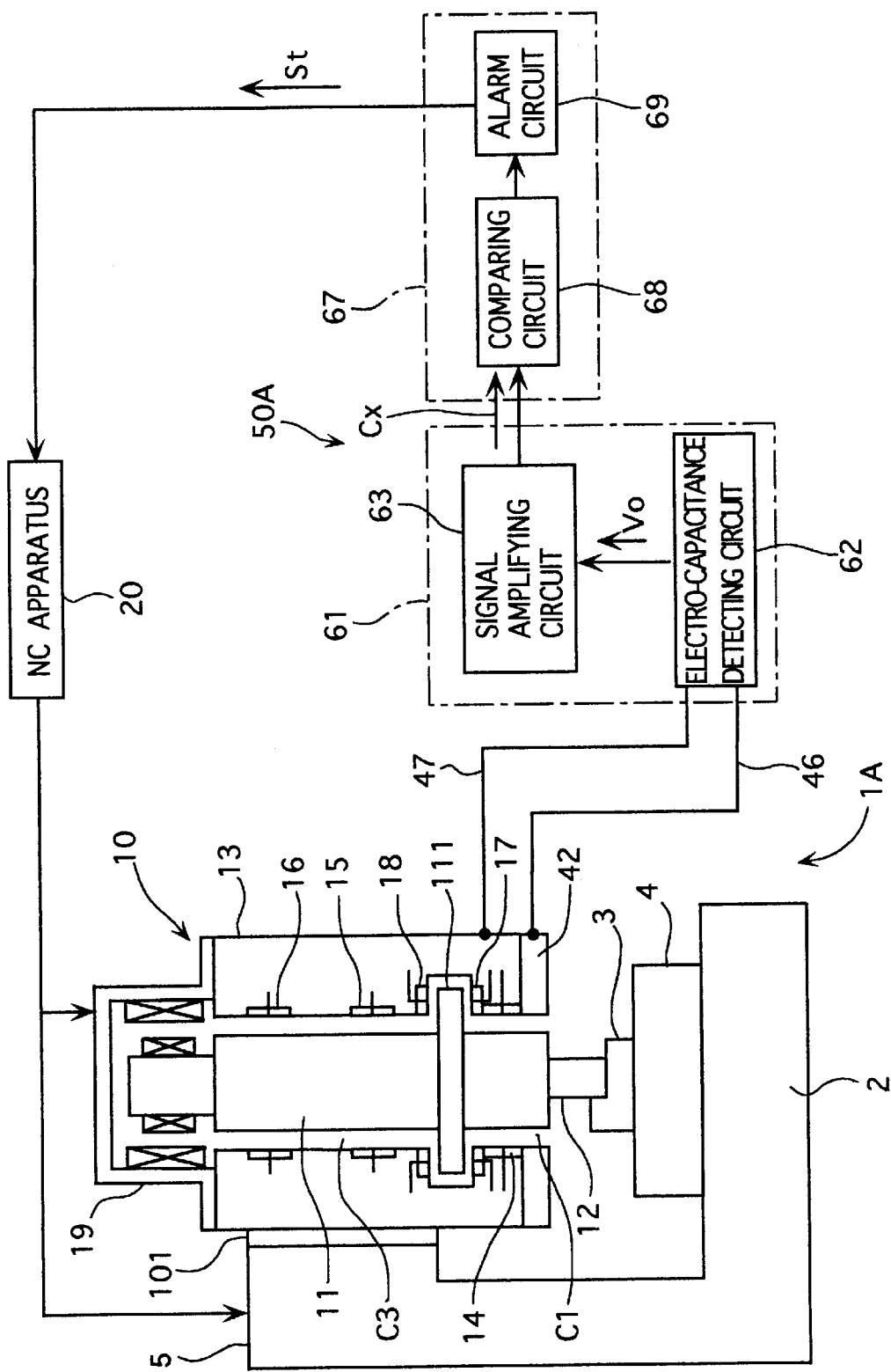
FIG. 6 is a diagram showing an air bearing machine tool having a spindle state detector of second embodiment according to the present invention.

The capacitor C0 composed of the spindle 11 and the housing 13 is used in the above-described first embodiment. As shown in FIG. 6, a spindle state detector according to the second embodiment has a capacitor (first capacitor C1) composed of an independent first electrode 42 attached to the housing 13 through a spacer 45 (see FIG. 7) as well as a capacitor composed of the spindle 11 and the housing 13 (third capacitor C3 identical with the capacitor C0 of the first embodiment).

Incidentally, a description of a member which has been described or is identical with or similar to the above-described member will be omitted or abbreviated.

(2-2) Basic Structure of Machine Tool

A machine tool 1A according to the present embodiment is shown in FIG. 6.

The spindle 11 of the first embodiment is electrically connected to the housing 13 through the tool 12, the work 3, the table 4, the base 2 and the column 5 to form the electric path E having the capacitor C0 with the spindle 11 and the housing 13 as the electrodes.

On the other hand, an insulator 101 is inserted between the spindle head 10 and the column 5 of the present embodiment, thereby insulating the spindle head 10 from the machine tool 1A body composed of the column 5, the base 2, the table 4, etc.

Accordingly, when the spindle 11 is in a normal condition, the spindle 11 and the housing 13 do not contact and are electrically insulated.

When the work 3 is made of metal, the spindle 11 is electrically conducted to the table 4, the base 2 and the column 5 through the tool 12 and the work 3.

(2-3) Arrangement of Spindle State Detector

As shown in FIG. 6, the spindle state detector 50A of the present embodiment has a cylindrical first electrode 42 encircling the distal end of the spindle 11, an electro-capacitance detector 61 for detecting the state of the bearing gap between the spindle 11 and the housing 13 by detecting the electro-capacitance between the spindle 11 and the first electrode 42, and a determining means 67 for outputting an alarm signal to the NC apparatus 20 in accordance with the electro-capacitance detected by the electro-capacitance detector 61.

Figure 7:
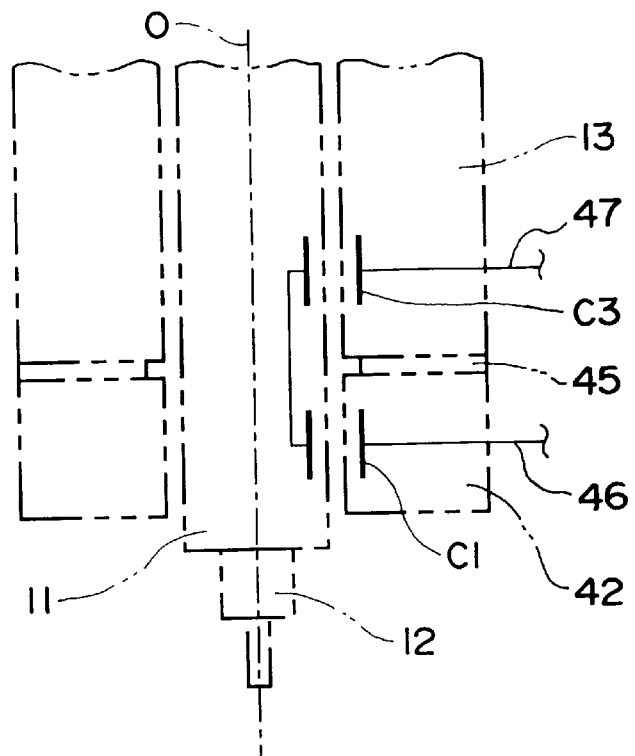
FIG. 7 is a diagram showing a structure around a spindle and an electrode of the second embodiment.

As shown in FIG. 7, the first electrode 42 is a cylindrical member made of aluminum, which is attached to the housing 3 through the spacer 45 made of acrylic resin to be electrically insulated from the housing 13 and is electrically connected to an electro-capacitance detecting circuit 62 (described below) by a cable 46.

Similarly, the housing 13 electrically insulated from the machine tool body is also electrically connected to the electro-capacitance detecting circuit 62 by a cable 47.

Accordingly, the spindle 11, the housing 13 and the first electrode 42 electrically insulated with each other can be regarded as the first capacitor C1 composed of the first electrode 42 and the spindle 11 and the third capacitor C3 composed of the housing 13 and the spindle 11. These two capacitors C1 and C3 are serial-connected through the spindle 11.

Figure 8:
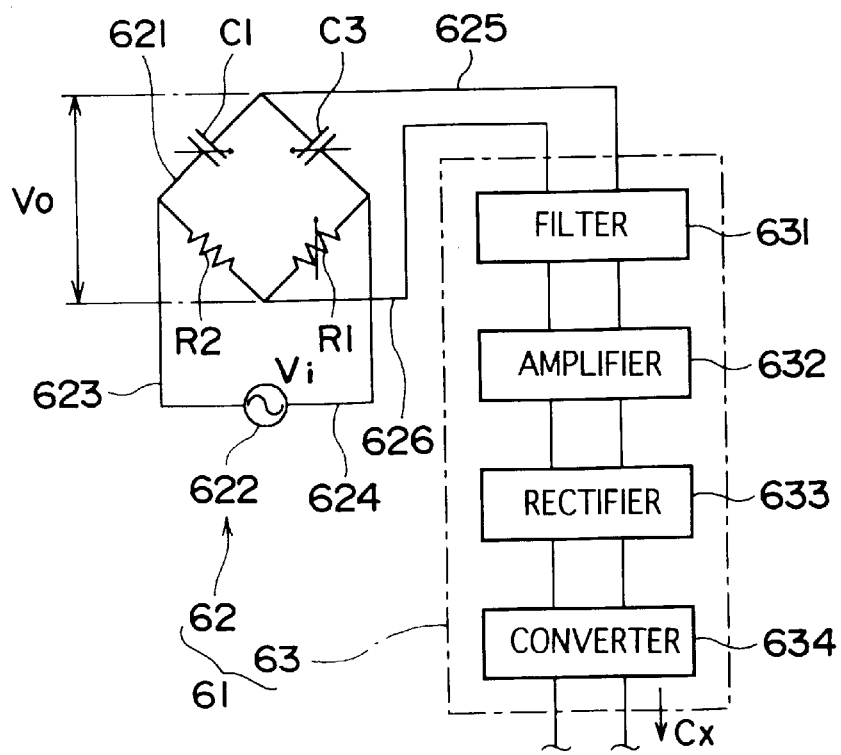
FIG. 8 is a diagram showing a structure of an electro-capacitance detecting portion and signal amplifying portion of the second embodiment.

As shown in FIG. 6 and FIG. 8, the electro-capacitance detector 61 is composed of the electro-capacitance detecting circuit 62 and a signal amplifying circuit 63.

The electro-capacitance detecting circuit 62 has a bridge circuit 621 including the above two capacitors (C1, C3) and an oscillator 622 supplying an impressed voltage to the bridge circuit 621.

The bridge circuit 621 has two resistors R1 and R2 parallel-connected to the two capacitors C1 and C3. Input wirings 623 and 624 are provided to a connecting portion of the capacitors C1, C3 and the resistors R1, R2.

The oscillator 622 impresses voltage Vi to the bridge circuit 621 being connected to the wirings 623 and 624. Incidentally, the frequency of the oscillator 622 is preferably set within a frequency band unlikely to be influenced by an external noise, e.g., approximately 10 kHz.

Output wirings 625 and 626 are respectively provided to a connecting portion of the first capacitor C1 and the third capacitor C3 and to a connecting portion of the resistors R1 and R2. The output wirings 625 and 626 are connected to a filter 631 constituting the signal amplifying circuit 63. When a voltage unbalance is caused in the bridge circuit 621, a voltage output signal Vo is outputted from the output wirings 625 and 626.

When impedance of the respective capacitors C1 and C3 is represented as Zc1 and Zc2, and the resistance of the resistors R1 and R2 is represented as R1 and R2, the voltage output signal Vo of the voltage output signal can be expressed by following formula (22).

$$Vo = \frac{R2|Zc2| - R1|Zc1|}{(R1 + R2)(|Zc1| + |Zc2|)} Vi \qquad (22)$$

When the electro-capacitance of the capacitor C1 and C3 is represented as C1 and C3, respectively, the equilibrium is effected under the condition of following formula (23).

$$C1 = C3 \frac{R2}{R1} \qquad (23)$$

The signal amplifying circuit 63 amplifies and converts the voltage output signal Vo from the electro-capacitance detecting circuit 62 by the filter 631, an amplifier 632, a rectifier 633 and a converter 634 to output to the determining means 67.

The filter 631 is a band-pass filter of which cutoff frequency is consistent with a frequency of the oscillator 622 and which removes an external noise of the voltage output signal Vo.

The converter 634 calculates and outputs an electro-capacitance change Cx of the capacitors C1 and C3 by the formula (22) and (23) based on the voltage output signal Vo. The output signal Cx is outputted to the determining means 67.

As shown in FIG. 6, the determining means 67 is composed of a comparing circuit 68 and an alarm circuit 69.

Though not shown in FIG. 6, the comparing circuit 68 has an acquiring section for acquiring an output signal Cx outputted from the electro-capacitance sensor 61, a memory section for calculating and memorizing the threshold value Co in accordance with a processing condition of the machine tool 1A using the numerical formula (9) based on the limit value Ao of the displacement of the rotation axis established so that the spindle 11 and the housing 13 do not contact, and an arithmetic section for comparing the output signal Cx from the acquiring section and the threshold value Co.

The result of the comparison by the arithmetic section is sent to the alarm circuit 69. When the output signal Cx exceeds the threshold value Co, the alarm circuit 69 outputs the control signal ST to the NC apparatus 20 to stop the spindle 11.

(2-4) Setting and Operation of Second Embodiment

The setting of the spindle state detector 50A and operation thereof will be described below.

(1) The limit value Ao of the displacement of the rotation axis is determined based on the rotation speed of the spindle 11 of the machine tool 1A and the feed speed of the table 4, etc., and is inputted to the determining means 67.

(2) The machine tool 1A is operated without applying the work 3, in other words, under neutral condition of the spindle 11.

(3) The electro-capacitance detecting circuit 62 is switched on to impress a voltage Vi by the oscillator 622 to the bridge circuit 621, thereby obtaining voltage balance of the bridge circuit 621 under neutral condition. Incidentally, a variable resistor can be used for either one of the resistors R1 and R2 (R1 in FIG. 8) structuring the bridge circuit 621 to obtain the voltage balance by changing the resistance value of the variable resistor.

(4) The spindle 11 is stopped by the NC apparatus 20 after the voltage balance under the neutral condition of the spindle 11. The work 3 is put on the table 4 and the processing is started by inputting the processing program to the NC apparatus 20.

(5) The electro-capacitance detector 61 constantly detects the output signal Cx as the electro-capacitance between the spindle 11 and the housing 13 and between the spindle 11 and the first electrode 42 to transmit to the determining means 67.

(6) The comparing circuit 68 compares the output signal Cx and the threshold value Co calculated by the limit value Ao of the displacement of the rotation axis. When the output signal Cx exceeds the threshold value Co, the control signal ST is outputted from the alarm circuit 69 to the NC apparatus 20 to stop the rotation of the spindle 11.

(2-5) Effect of Second Embodiment

According to the above-described second embodiment, following effect can be obtained.

Since the spindle state detector 50A has the first electrode 42 spaced apart from the spindle 11, the arrangement can be regarded as the capacitor C1 composed of the first electrode 42 and the spindle 11. Accordingly, no multiple sensors are necessary to be disposed and the three-dimensional movement of the spindle 11 can be monitored with a simple construction.

Since the relative displacement of the housing 13 and the spindle 11 is detected by the first electrode 42 electrically insulated from the housing 13 and disposed adjacent to the distal end of the spindle 11, the system can be easily installed irrespective of the structure and specification of the machine tool 1A. Especially, the system can be additionally installed after installing the machine tool 1A.

Since the electro-capacitance detector 61 has the bridge circuit 621 which includes two capacitors C1 and C3 constituted of the spindle 11, the housing 13 and the first electrode 42, the relative displacement of the spindle 11 and the housing 13 can be confirmed by monitoring the voltage balance of the bridge circuit 621.

The bridge circuit 621 also allows confirming the electro-capacitance change of the two capacitors C1 and C3 distinctively.

Accordingly, the relative displacement of the spindle 11 and the housing 13 can be detected highly accurately, thereby largely improving the operation efficiency of the machine tool 1A having the NC apparatus 20.

Since the spindle state detector 50A has determining means 67, the operative condition of the machine tool 1A can be controlled by outputting the control signal ST from the determining means 67 when the output signal Cx exceeds the threshold value Co outputted by the electro-capacitance detector 61. Accordingly, the automation of the machine tool 1A can be further facilitated.

(3) Third Embodiment/Electro-Capacitance: Two Independent Electrodes Type

Third embodiment of the present invention will be described below.

Incidentally, a description of a member which has been described or is identical with or similar to the above-described members will be omitted or abbreviated.

In the spindle state detector 50A according to the second embodiment, the first capacitor C1 composed of the spindle 11 and the first electrode 42 and the third capacitor C3 composed of the spindle 11 and the housing 13 are provided, both of which are incorporated in the bridge circuit 621.

Figure 9:
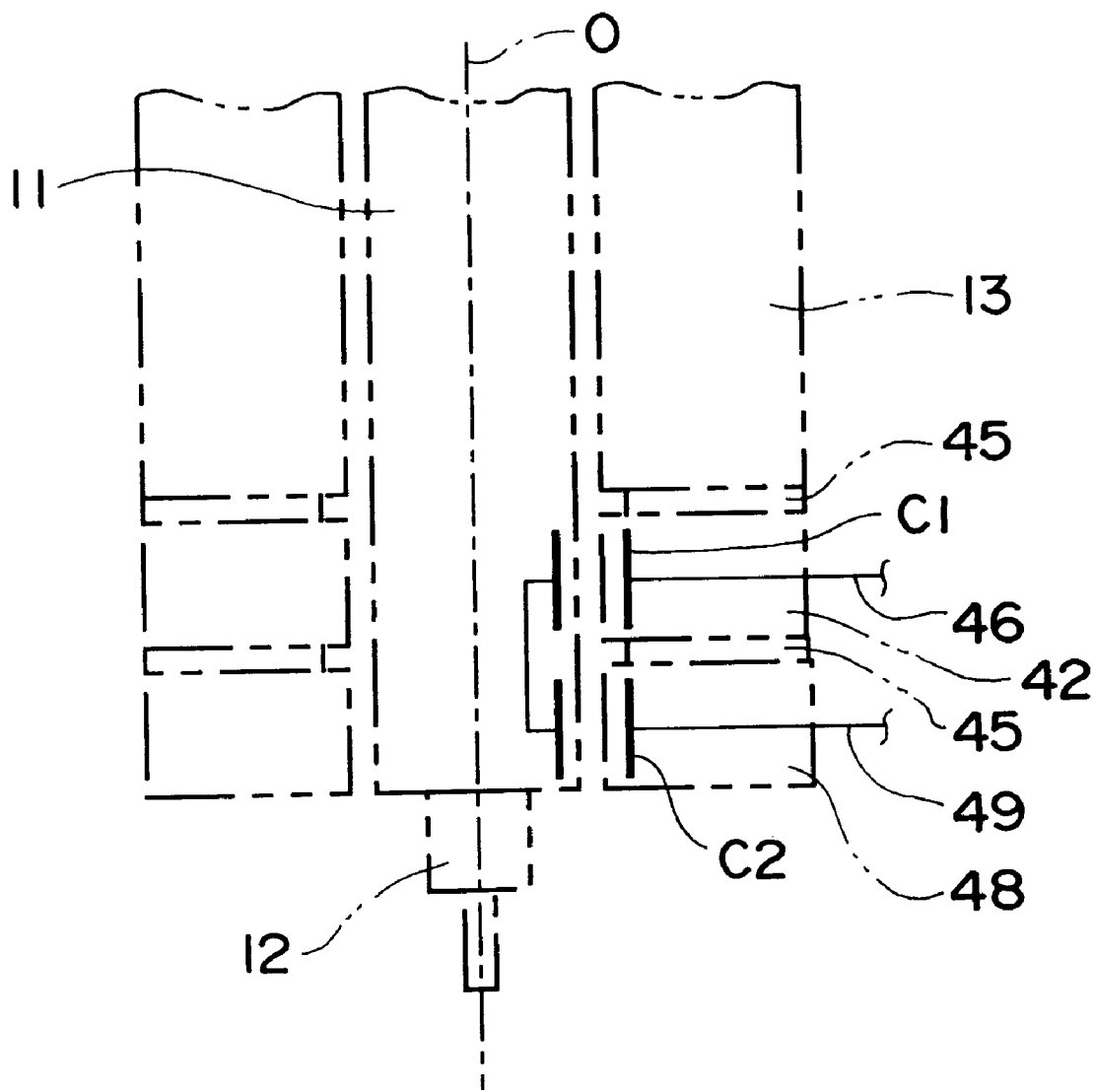
FIG. 9 is a diagram showing a structure around a spindle and an electrode of third embodiment.

On the other hand, as shown in FIG. 9, the spindle state detector according to the present embodiment is different from the second embodiment in that the spindle state detector of the present embodiment has the first electrode 42 similar to the second embodiment attached to the housing 13 through the spacer 45 and second electrode 48 attached below the first electrode 42 through another spacer 45.

The second electrode 48 is an aluminum cylindrical body similar to the first electrode, which is electrically connected to the electro-capacitance detector 61 described in the second embodiment by the cable 49. The second electrode 48 is electrically insulated from the first electrode 42 and the housing 13 through the spacer 45.

The first electrode 42 and the second electrode 48 are structured such that the first capacitor C1 composed of the spindle 11 and the first electrode 42 and a second capacitor C2 composed of the spindle 11 and the second electrode 48. These capacitors C1 and C2 are used as impedance of the bridge circuit of the electro-capacitance detecting circuit 62 described in the second embodiment.

The rest of the members and structure is similar to the above-described second embodiment. Accordingly, the description is omitted.

The spindle state detector according to the third embodiment has the following effects as well as the effect mentioned in the second embodiment.

The detection of the electro-capacitance using the voltage balance of the bridge circuit is conducted by the first electrode 42 and the second electrode 48 independently attached to the machine tool, the change in the electro-capacitance between the spindle 11 and the respective electrodes 42 and 48 can be detected without considering the electric insulation between the machine tool body and the housing 13, thereby detecting the relative displacement between the spindle 11 and the housing 13.

Accordingly, the spindle state detector according to the present invention can be installed easily to the conventionally used machine tools, thereby greatly enlarging the range of application of the present detector.

(4) Fourth Embodiment/Magnetic Flux Type Spindle State Detector

The spindle state detector 50 of the first embodiment regards the bearing gap between the spindle 11 and the housing 13 as the capacitor C0. The spindle state detector 50 detects the electro-capacitance change of the capacitor C0 as the change in current value to avoid the contact between the spindle 11 and the housing 13.

However, according to the present invention, the combination of the spindle 11, the tool 12, the work 3, the table 4, the base 2, the column 5 and the housing 13 of the machine tool shown in FIG. 4 may be regarded a magnetic core having the spindle 11 and the housing 13 as a magnetic pole. The machine tool 1 shown in FIG. 4 may use a spindle state detector where magnetic flux can be generated inside the magnetic core and the magnetic flux inside the magnetic core is detected by a magnetic flux detector to detect the relative displacement of the spindle and the housing.

In other words, as shown in FIG. 3, a magnetic flux generator including magnetic flux generating coil 71 and a magnetic flux detecting coil 72 may be provided to detect a magnetic flux change inside a magnetic core G caused in accordance with the relative displacement change between the spindle 11 and the housing 13 as the magnetic pole and the housing 13 by the magnetic flux detecting coil 72 as an induced electromotive force.

In the above arrangement, the winding 711 and the winding 721 are preferably spaced apart from the spindle 11 to be disposed without making contact.

The rest of the structure of the air bearing machine tool applied with the spindle state detector may be identical with the air bearing machine tool 1, etc., according to the above-described embodiments. Effects similar to the above-described embodiments can be obtained by the above spindle state detector.

(5-1) Fifth Embodiment/Contact Avoidance Controller/Electro-Capacitance: Independent Electrode and Housing Electrode Type A contact avoidance controller using electro-capacitance: independent electrode type spindle state detector will be described below as fifth embodiment of the present invention.

A spindle state detector is described in the above embodiments, however, the embodiments described below relates to a device for detecting the spindle state and further for controlling the spindle to avoid contact.

(5-2) Basic Structure of Machine Tool

Figure 10:
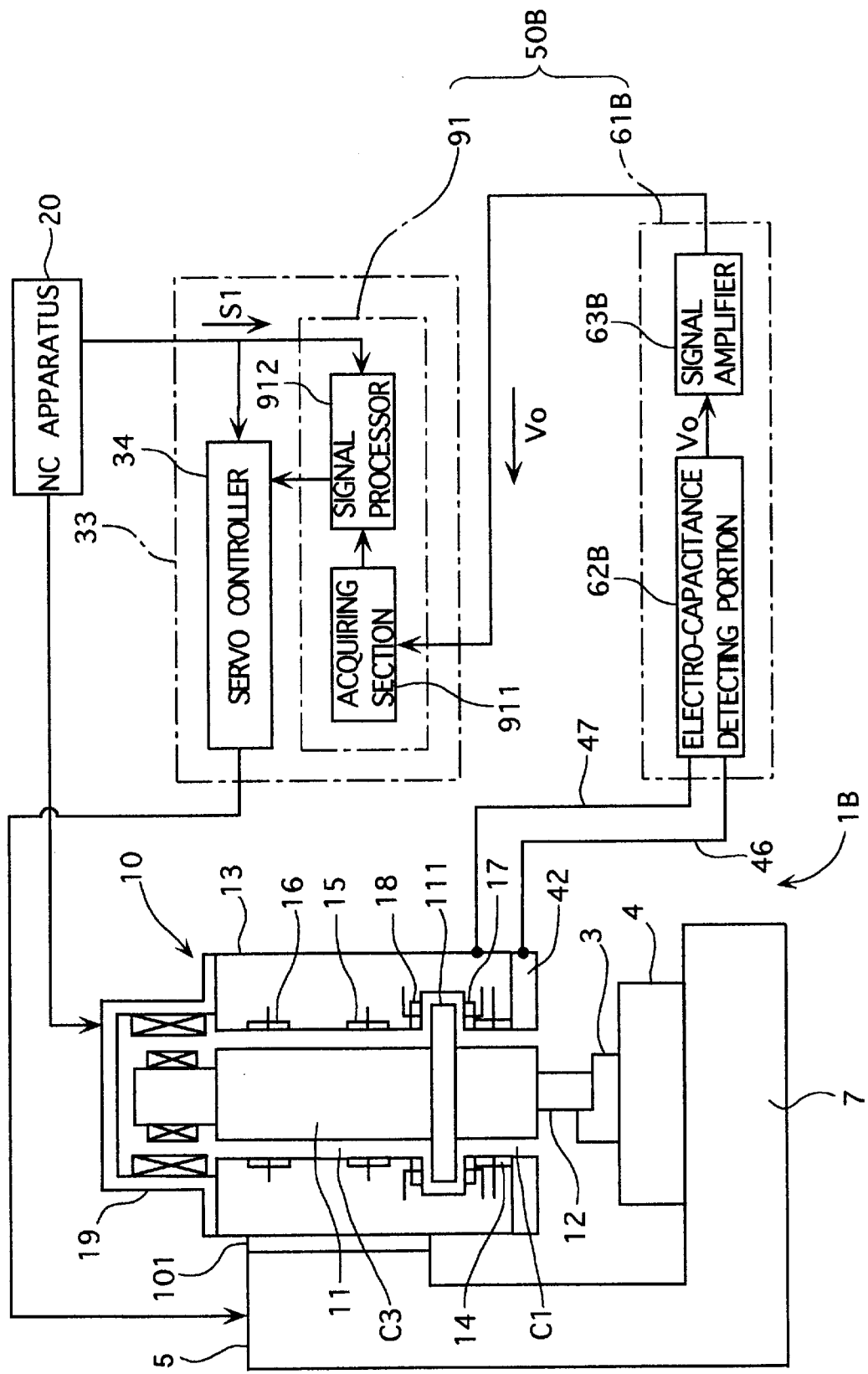
FIG. 10 is a diagram showing an air bearing machine tool having a spindle state detector according to fifth embodiment of the present invention.

The basic structure of a machine tool 1B of the present embodiment shown in FIG. 10 is the same as the above-described embodiments. Therefore, description of a member which has been described or is identical with or similar to the above-described members will be omitted or abbreviated.

An insulator 101 is inserted between the spindle head 10 and the column 5. The spindle head 10 is electrically insulated from the machine tool body composed of the column 5, the base 2 and the table 4, etc.

Accordingly, when the spindle 11 is in a normal state, the spindle and the housing 13 do not contact each other, thereby being electrically insulated.

When the work 3 is made of metal, the spindle 11 is electrically conducted to the table 4, the base 2 and the column 5 through the tool 12 and the work 3.

(5-3) Contact Avoidance Controller/Arrangement for Detecting Spindle State

As shown in FIG. 10, the machine tool 1B has a spindle state detector 61B for detecting the relative displacement of the spindle 11 and the housing 13 and a contact avoidance controller SOB having a feed speed controller 91 for controlling the relative feed speed of the spindle 11 and the housing 13 by the moving mechanism 30. Incidentally, the spindle state detector 61B is attached to the air bearing machine tool 1B for measuring the movement of the spindle 11 and the feed speed controller 91 is incorporated inside the motor driver 33 as well as servo controller 34 to select whether the feed speed control should be conducted or not.

The spindle state detector 61B has a cylindrical first electrode 42 encircling the distal end of the spindle 11, an electro-capacitance detecting portion 62B for detecting the contact condition of the spindle 11 and the housing 13 by detecting the electro-capacitance between the spindle 11 and the first electrode 42 and a signal amplifier 63B for amplifying the electro-capacitance signal detected by the electro-capacitance detecting portion 62B to output to the feed speed controller 91.

The first electrode 42 is an aluminum cylindrical member, which is attached to the housing 13 through the spacer 45 made of acrylic resin to be electrically insulated from the housing 13, and is electrically connected to the electro-capacitance detecting portion 62B (described below) through the cable 46, as shown in FIG. 7.

Similarly, the housing 13 electrically insulated from the machine tool body is electrically connected to the electro-capacitance detecting portion 62B by the cable 47.

Accordingly, the spindle 11, the housing 13 and the first electrode 42 electrically insulated with each other can be regarded as the first capacitor C1 composed of the first electrode 42 and the spindle 11 and the third capacitor C3 composed of the housing 13 and the spindle 11. These two capacitors C1 and C3 are serial-connected through the spindle 11.

Figure 11:
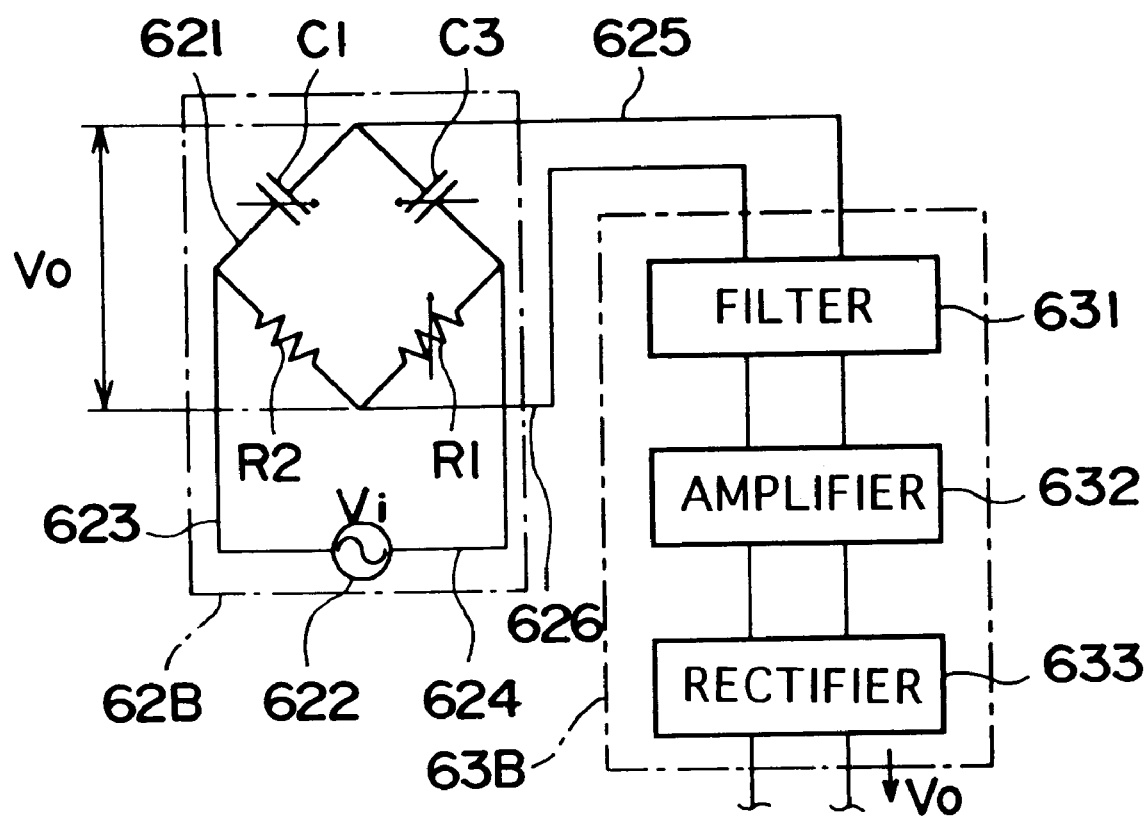
FIG. 11 is a diagram showing a structure of an electro-capacitance detecting portion and a signal amplifier of the fifth embodiment.

The electro-capacitance detecting portion 62B and the signal amplifier 63B are shown in FIG. 11.

Similarly to the electro-capacitance detecting circuit 62 (see FIG. 8) of the second embodiment, the electro-capacitance detecting portion 62B includes the bridge circuit having the two capacitors C1 and C3, and the description is omitted. Though the signal amplifier 63B is similar to the signal amplifying circuit 63 (see FIG. 8), it lacks the converter 634 at the final stage and the output signal Vo is directly outputted. The rest of the arrangement is similar to the second embodiment, thus omitting description therefor.

The output signal amplified by the signal amplifier 63B is outputted to the feed speed controller 91 as the electro-capacitance signal Vo.

(5-4) Contact Avoidance Controller/Feed Speed Controller

As shown in FIG. 12, the control system of the machine tool 1B has the feed speed controller 91, a switch 92 for selecting whether the feed speed controller 12 is used or not, the servo controller 34 and the moving mechanism 30 for moving the table 4 to define relative position of the work 3 and the tool 12.

The moving mechanism 30 is composed of a DC servomotor 31 and a feed screw 32. The DC servomotor 31 is operated by inputting pulse waves.

The servo controller 34 has a sensor 341 provided to the DC servomotor 31 and a feedback circuit 342. The servo controller 34 controls the operation of the DC servomotor 31 in accordance with the condition of the DC servomotor 31 detected by the sensor 341.

The feed speed controller 91 has an acquiring section 911 for acquiring the electro-capacitance signal Vo from the electro-capacitance detector 61B and a signal processor 912 for converting the acquired electro-capacitance signal Vo.

As shown in FIG. 12, the acquiring section 911 has an amplifier 911A for inversely amplifying the output signal Vo as well as a counter 911B for inputting the control signal S1 according to a movement command by the NC apparatus 20, and a D/A converter 911C for analog-converting the control signal S1.

The signal processor 912 has a control-start deciding circuit 912A for determining whether a control by the feed speed controller 91 is started or not, an amplifier 912B for amplifying the output signal, and a V/F converter 912C for conducting V/F conversion. The control start deciding circuit 912A is connected to an external voltage divider 913 for shift-converting the electro-capacitance signal Vo.

As shown in FIG. 13, the electro-capacitance signal Vo from the spindle state detector 61B is converted by the acquiring section 911 and the signal processor 912 as follows:

(1) When the switch 92 is switched downward in FIG. 12, a control by the feed speed controller is conducted.

Figure 13A:
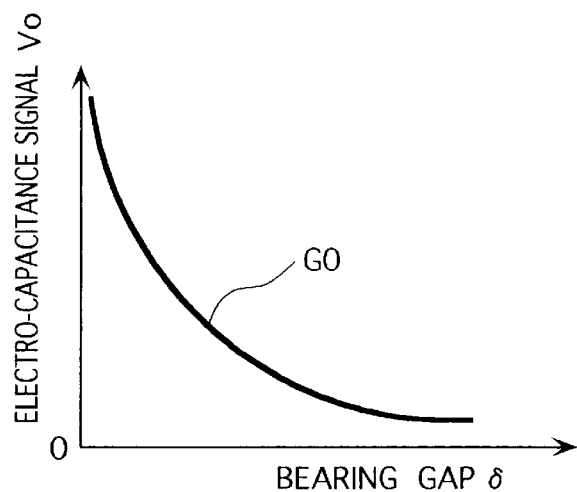
FIG. 13(A), FIG. 13(B) and FIG. 13(C) are graphs for explaining signal processing by a signal processor of the feed speed controller of the fifth embodiment.

(2) The electro-capacitance signal Vo is changed in inverse proportion to a change of the bearing gap δ between the spindle 11 and the housing 13, which has positive output characteristic shown in a graph G0 of FIG. 13(A).

Figure 13B:
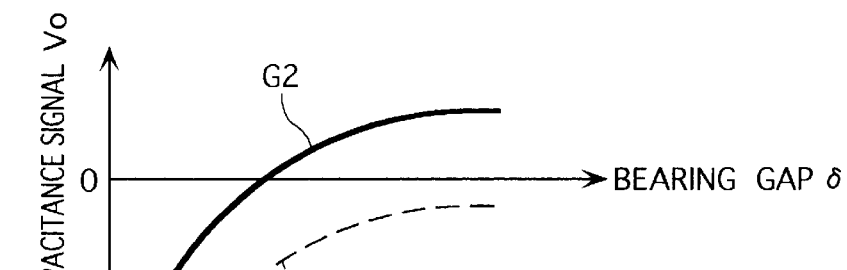

(3) The electro-capacitance signal Vo having such output characteristic is reversely amplified by the amplifier 911A of the acquiring section 911 into another output characteristic shown in graph G1 of FIG. 13(B), i.e., into negative side, to be sent to the signal processor 912.

(4) The reversely-amplified electro-capacitance signal Vo is positively shift-converted by the external voltage divider 913 in the signal processor 912 to be shift-converted to positive side into still another output characteristic shown in graph G2 of FIG. 13 (B). Subsequently, a clipping convert is conducted for clipping the positive side area of the output characteristic G2, thereby converting the electro-capacitance signal Vo into still another output characteristic shown in graph G3 of FIG. 13 (C).

Incidentally, the shifting amount for the shift-conversion can be optionally set, which is appropriately set in accordance with a specification of the machine tool 1B and the processing condition.

(5) The control signal S1 of the NC apparatus 20 is sent to the counter 911B of the acquiring section 911 and is D/A converted by the D/A converter 911C to be sent to the signal processor 912 as a voltage output signal Vs on the positive side.

Specifically, the command pulse of the control signal S1 is counted at a predetermined period, e.g. every 0.1 ms, by the counter 911B. Ordinarily, the air bearing machine tool 1B is a high-accuracy machine tool, which often employs a servo feedback pulse of approximately 10 nm/P. When the feed speed is set as 1200 m/min, a number of the command pulse counted by the counter period 1 ms of the counter 911B comes to 2000, which is converted into an analog voltage by the D/A converter 911C to be sent to the signal processor 912 as a positive voltage output signal Vs.

(6) The electro-capacitance signal Vo as well as the voltage output signal Vs are amplified by the amplifier 912B to be pulse-converted by the V/F converter 912C.

(5-5) Control of Fifth Embodiment

According to the above-described contact avoidance controller 50B, the contact avoidance control of the spindle 11 and the housing 13 of the machine tool 1B is conducted as follows:

(1) In FIG. 10, the relative displacement of the spindle 11 and the housing 13 is detected as the electro-capacitance signal Vo by the spindle state detector 61B having the first electrode 42 and the electro-capacitance detecting portion 62B, which is outputted to the feed speed controller 91 through the signal amplifier 63B.

(2) In FIG. 12, the signal processor 912 of the feed speed controller 91 converts the electro-capacitance signal Vo by the control start deciding circuit 912A to conduct arithmetical processing with the voltage output signal Vs based on the control signal S1 from the NC apparatus 20.

Figure 13C:
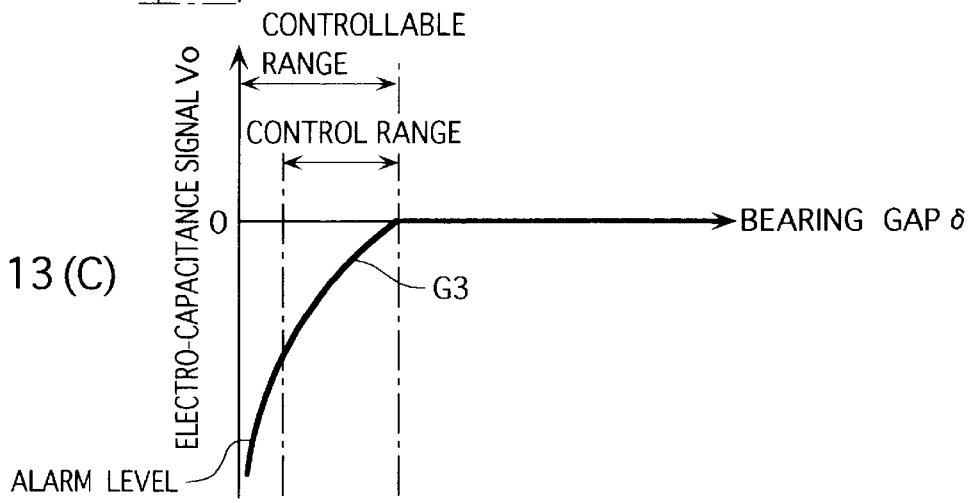

As shown in FIG. 13(C), the output characteristic G3 of the electro-capacitance signal Vo by the control start deciding circuit 912A is shown as Vo=0 after a clipping point intersecting Vo=0, i.e., when there is sufficient bearing gap $\delta$ between the spindle 11 and the housing 13. Accordingly, the voltage output signal sent to the V/F converter 912C is only of Vs based on the control signal S1 and the DC servomotor 31 is operated in accordance with the control signal S1.

(3) On the other hand, when the bearing gap $\delta$ is decreased and there is possible contact of the spindle 11 and the housing 13, the electro-capacitance signal Vo is magnified in the negative direction as shown in FIG. 13(C). Accordingly, the signal Vs based on the control signal S1 is offset by the electro-capacitance signal Vo, thereby decreasing the input voltage to the amplifier 912B and lowering the output pulse frequency of the V/F converter 912C.

(4) The feed speed of the DC servomotor 31 is decreased as the output pulse frequency of the V/F converter 912C is lowered, thereby decreasing a contact force between the tool 12 and the work 3. Accordingly, the load applied to the spindle 11 is lessened, so that the spindle 11 is reseated adjacent to the original rotation axis to widen the bearing gap $\delta$ to avoid contact of the spindle 11 and the housing 13.

The contact of the spindle 11 and the housing 13 can be continuously prevented during operation of the machine tool 1B by repeating above process.

(5) An excessive force can be applied to the spindle 11 momentarily by an operation error etc. to deviate from the controllable range shown in FIG. 13(C). Therefore, it is preferable that an alarm level is set within the controllable range so that the relative movement is forcibly stopped by the control signal S1 from the NC apparatus 20 when the bearing gap $\delta$ moves out of the alarm level of the controllable range.

(5-6) Effect of Fifth Embodiment

According to the above-described fifth embodiment, following effect can be obtained.

Since the contact avoidance controller 50B has the spindle state detector 61B, the relative displacement of the spindle 11 and the housing 13 can always be monitored during the operation of the air bearing machine tool 1B. Further, since the contact avoidance controller 50B has the feed speed controller 91, the relative feed speed of the tool 12 and the work 3 can be changed in accordance with the relative displacement detected by the spindle state detector 61B.

Accordingly, the load applied to the spindle 11 can be controlled by the spindle state detector 61B and the feed speed controller 91 to conduct the processing while keeping the relative displacement within a predetermined range. Therefore, the contact of the spindle 11 and the housing 13 can be avoided without deteriorating the processing efficiency of the work 3.

Since the spindle state detector 61B has the first capacitor C1 composed of the spindle 11 and the first electrode 42 and the third capacitor C3 composed of the spindle 11 and the housing 13 used for detecting the three-dimensional movement of the spindle 11 at the bearing gap of the spindle 11 and the housing 13, there is no need for multiple sensors to be disposed in the machine tool, thereby simplifying the structure of the contact avoidance controller 50B.

Since the spindle state detector 61B detects the electro-capacitance between the spindle 11 and the first electrode 42 to detect the relative displacement of the spindle 11 and the housing 13, the contact avoidance controller can be easily installed to an air bearing machine tool irrespective of the structure of the air bearing machine tool.

Since the feed speed controller 91 has the control start deciding circuit 912A, the feeding operation of the air bearing machine tool 1B can be conducted without control by the feed speed controller 91 until the bearing gap $\delta$ reaches a predetermined value. Accordingly, the feeding can be operated in accordance with the processing program set by the NC apparatus 20 of the machine tool 1B, thereby largely improving the processing efficiency of the work 3.

On the other hand, when the electro-capacitance signal Vo reaches the predetermined value, the feed speed controller 91 starts to control the relative feed speed of the spindle 11 and the work 3 to lessen the load applied to the spindle 11, thereby avoiding the contact of the spindle 11 and the housing 13.

(6-1) Sixth Embodiment/Contact Avoidance Controller/Electro-Capacitance: Independent Electrode and Housing Electrode Type A contact avoidance controller according to sixth embodiment of the present invention will be described below. Incidentally, a description of a member which has been described or is identical with or similar to the above-described member will be omitted or abbreviated.

The spindle state detector 61B of a contact avoidance controller 50B according to the fifth embodiment has the first capacitor C1 composed of the spindle 11 and the first electrode 42 and the third capacitor C3 composed of the spindle 11 and the housing 13 and uses these two capacitors to detect the three-dimensional displacement of the spindle 11 within the bearing gap between the spindle 11 and the housing 13.

Figure 14:
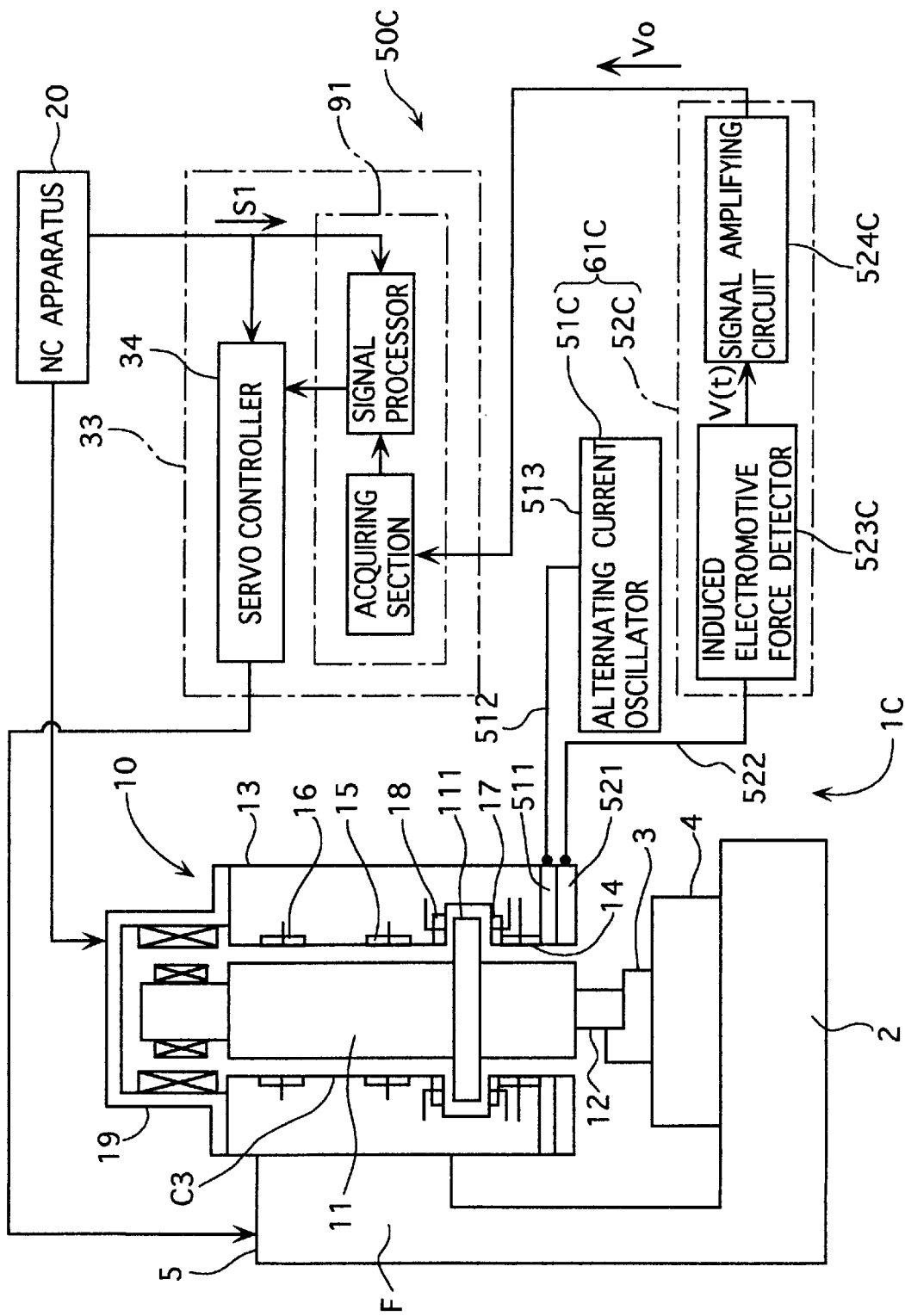
FIG. 14 is a diagram showing an air bearing machine tool having spindle state detector of sixth embodiment according to the present invention.

In contrast to the above arrangement, as shown in FIG. 14, an air bearing machine tool 1C according to the present embodiment has no insulator between the housing 13 and the column 5. The spindle 11, the tool 12, the work 3, the table 4, the base 2, the column 5 and the housing 13 are electrically connected to form an electric path F including the third capacitor C3 having electrodes of the spindle 11 and the housing 13.

The spindle state detector 61C of the contact avoidance controller 50C has a current generator 51C for sending electric current to the electric path F and an electro-capacitance detector 52C for detecting the electro-capacitance of the third capacitor C3 to detect the electro-capacitance of the third capacitor C3 by generating the electric current in the electric path F.

The current generator 51C has the same arrangement as in the above-described first embodiment, which has the ring-shaped excitation coil 511 encircling and spaced apart from the distal end of the spindle 11, and the alternating current oscillator 513 connected to an end of the winding 511B wound to the magnetic core 511A of the excitation coil 511 through the cable 512 as shown in FIG. 5.

The electro-capacitance detector 52C has the same arrangement as in the above-described first embodiment, which has the detection coil 521 encircling and spaced apart from the distal end of the spindle 11, an induced electromotive force detector 523C connected to an end of the winding 521B wound to the magnetic core 521A of the detection coil 521 through the cable 522, and a signal amplifying circuit 524C for amplifying the output signal of the induced electromotive force detector 523C.

The relationship between the electro-capacitance of the third capacitor C3 and the induced electromotive force V(t) is the same as the description in the first embodiment, which is omitted here.

As has been described in the first embodiment, the electro-capacitance of the spindle 11 and the housing 13 is in proportion to the induced electromotive force detected by the detection coil 521. Accordingly, the change in the electro-capacitance in accordance with the change in the bearing gap between the spindle 11 and the housing 13 can be detected by measuring the current value in the winding 521B generated by the induced electromotive force of the detection coil 521 using the induced electromotive force detector 523C.

Accordingly, the relative displacement of the spindle 11 and the housing 13 can be detected by using the induced electromotive force V(t) as the electro-capacitance signal, thereby controlling to avoid the contact of the spindle 11 and the housing 13.

The electro-capacitance signal V(t) is amplified by the signal amplifying circuit 524C to be outputted to the feed speed controller 91.

The feed speed controller 91 processes the electro-capacitance signal V(t) and controls the relative feed speed of the tool 12 and the work 3, which is in accordance with the same arrangement and method as the above-described fifth embodiment. Accordingly, the description is omitted here.

(6-2) Effect of Sixth Embodiment

According to the contact avoidance controller 50C of the sixth embodiment, following effect can be obtained in addition to the effect of the fifth embodiment.

Since the third capacitor C3 having the spindle 11 and the housing 13 as the electrodes is incorporated in the electric path F connecting the spindle 11, the tool 12, the work 3 and the housing 13, the relative displacement of the spindle 11 and the housing 13 can be detected only by detecting the electro-capacitance of the capacitor C3 to detect the state of the bearing gap between the spindle 11 and the housing 13.

Accordingly, the contact avoidance controller 50C can be easily connected to the air bearing machine tool 1C irrespective of the structure of the air bearing machine tool 1C in the same way as the fifth embodiment.

Since the induced electromotive force V(t) provided to the detection coil 521 is a control element of the feed speed controller 91, the structure of the speed controller 91 can be simplified, thereby further simplifying the structure of the contact avoidance controller 50C.

Figure 15:
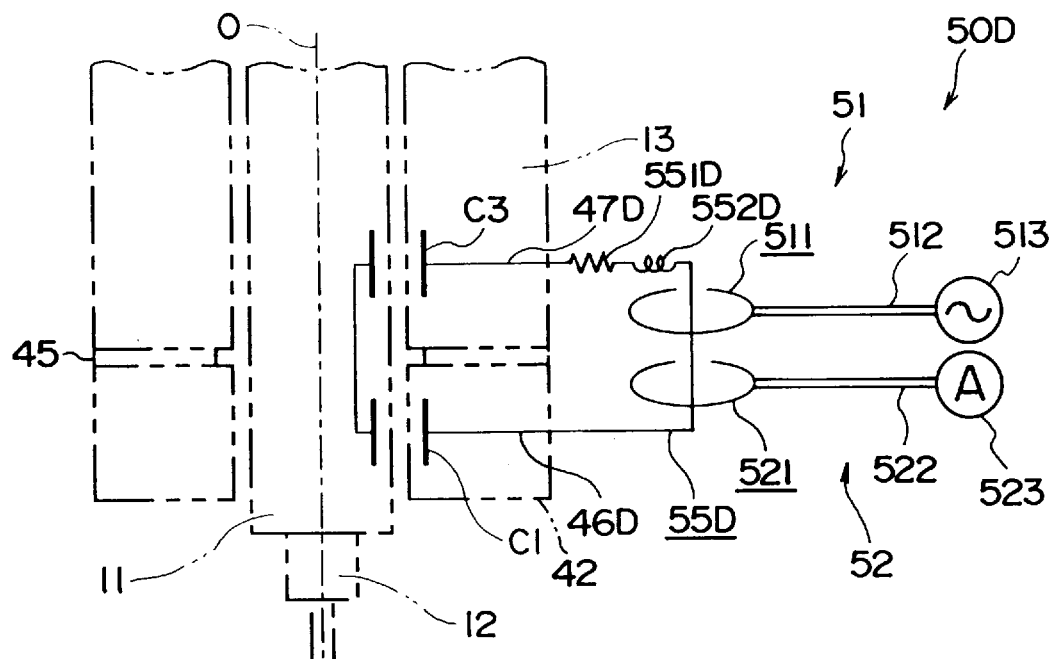
FIG. 15 is a diagram showing an air bearing machine tool having spindle state detector of seventh embodiment according to the present invention.

(7) Seventh Embodiment/Spindle State Detector/Electro-Capacitance—Housing Electrode and Independent Electrode—Induced Current Detecting Type Seventh embodiment according to the present invention will be described below. As shown in FIG. 15, the spindle state detector 50D of the present embodiment uses two capacitors, i.e. the first capacitor C1 formed between the first electrode 42 and the spindle 11 and the third capacitor C3 formed between the housing 13 and the spindle 11 in the same manner as the above-described second embodiment, and an induced current detecting circuit similar to the above-described first embodiment for detecting the electro-capacitance of the capacitors.

In the above arrangement, the spindle 11, the housing 13, the third capacitor C3, the first electrode 42 and the first capacitor C1 are the same as the above-described second embodiment (FIG. 6). Accordingly, the same reference sign is used and description is omitted. The respective capacitors C1 and C3 are serially connected by the spindle 11.

To detect the electro-capacitance of these capacitors, the present embodiment has the current generator 51, the electro-capacitance detector 52 and the determining means (see FIG. 4).

The cable 46D extending from the first capacitor C1 and the cable 47D extending from the third capacitor C3 are interconnected to form a closed circuit 55D. The excitation coil 511 and the detection coil 521 are coupled to the closed circuit 55D. The alternating current oscillator 513 is connected to the excitation coil 511 through the cable 512. The current sensor 523 is connected to the detection coil 521 through the cable 522.

Accordingly, an oscillation current is generated to the closed circuit 55D to detect a change in accordance with the electro-capacitance of the two capacitors C1 and C3.

Additionally, in the present embodiment, a resistor 551D and a coil 552D are disposed at an intermediate part of the detection closed circuit 55D to make the oscillation current resonant to detect minute change.

The resonant spindle state detector 50D is operated based on the following principle.

The induced electromotive force ω3 is calculated by the following formula (24).

$$\psi 3 = -\frac{d\Phi_1}{dt} = -\frac{S_1 dB_1}{dt} \quad (24)$$

Composite impedance Z can be calculated according to the following formula:

$$Z = R + j\omega L + \frac{1}{j\omega C}$$

C: Composite electro-capacitance of the first capacitor C1 and the third capacitor C3

R: Resistance of the resistor 551D

L: Inductance of the coil 552D

Absolute value of the composite impedance Z and electric current I3 flown in the circuit can be calculated by the following formulas:

$$|Z| = \sqrt{R^2 + \left(\omega L - \frac{1}{\omega C}\right)^2} \quad (25)$$

$$I3 = \frac{\psi 3}{Z} = \frac{\psi 3}{\sqrt{R^2 + \left(\omega L - \frac{1}{\omega C}\right)^2}} \quad (26)$$

When $$\omega L = \frac{1}{\omega C}$$

the composite impedance Z is minimum and the electromotive force generated to the detection coil 521 is the maximum. The output voltage of the detection coil 521 can be calculated as:

$$V_{out} = \frac{\mu_1 \mu_2 N_1 N_2 S_1}{\sqrt{R^2 + \left(\omega L - \frac{1}{\omega C}\right)^2}} \frac{d I_{in}}{dt} \quad (27)$$

In view of the formula (27), the output voltage shows the maximum in resonant condition, and the output voltage is increased around the resonant condition.

Accordingly, when the output voltage is set to be resonant around the threshold value of the bearing gap in the present embodiment, a weak fluctuation can be clearly detected even under relatively large bearing gap, i.e., not sufficient electro-capacitance, thereby detecting the threshold value more accurately.

Figure 16:
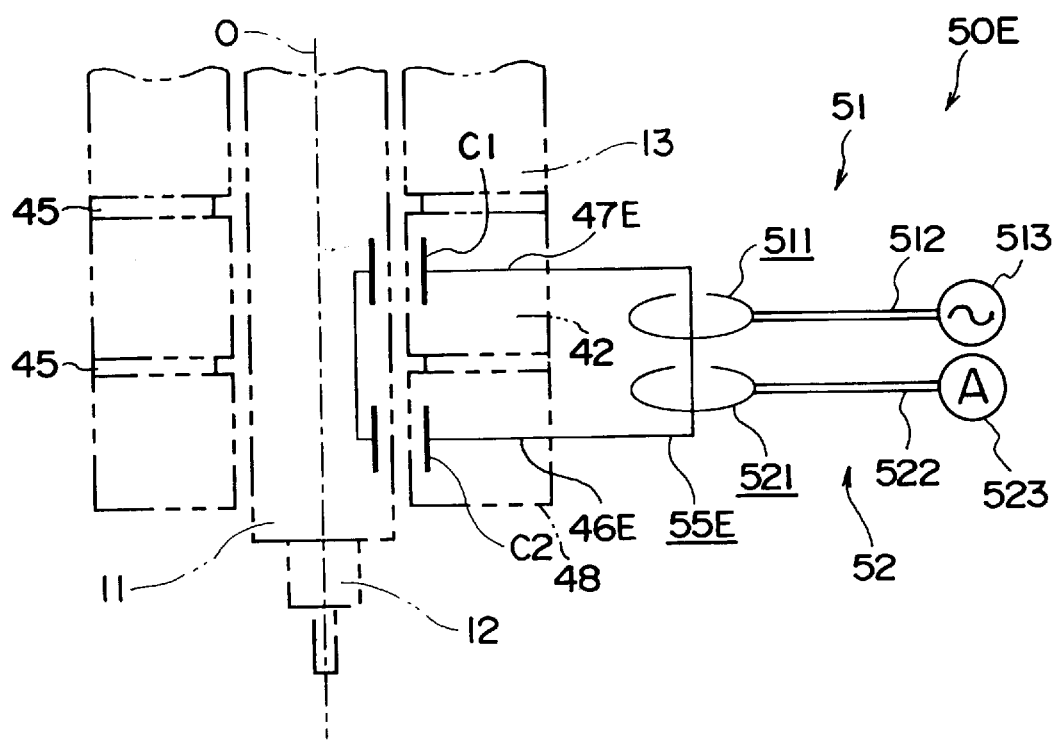
FIG. 16 is a diagram showing an air bearing machine tool having spindle state detector of eighth embodiment according to the present invention.
Figure 17:
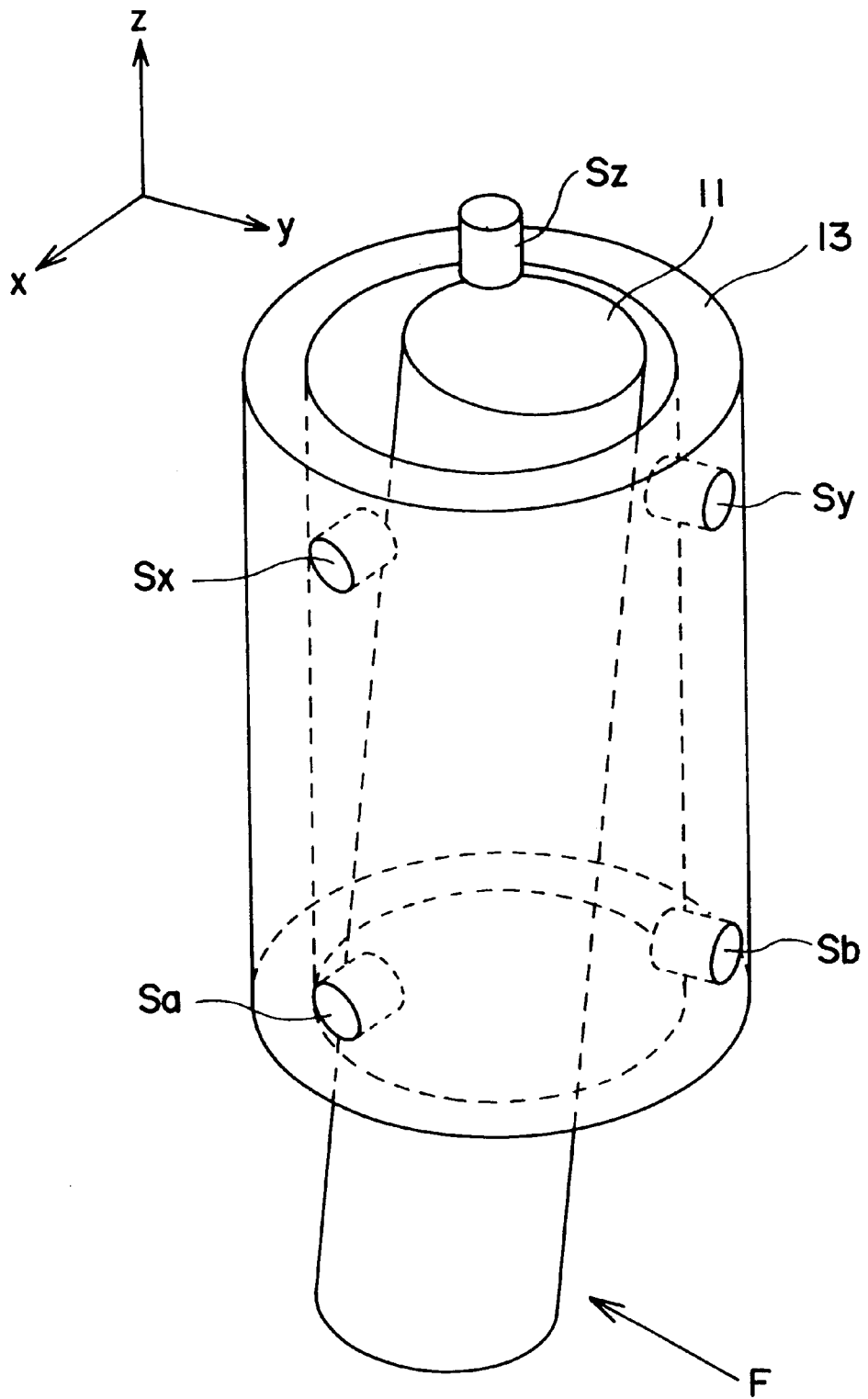
FIG. 17 is a perspective view showing a conventional monitoring system of a contact of a spindle and a housing.

(8) Eighth Embodiment/Spindle State Controller/Electro-Capacitance: Double Independent Electrodes—Induced Current Detection Type Eighth embodiment according to the present invention will be described below. As shown in FIG. 16, the spindle state detector 50E of the present embodiment uses two capacitors, i.e., the first capacitor C1 formed between the first electrode 42 and the spindle 11 and the second capacitor C2 formed between the second electrode 48 and the spindle 11 in the same manner as the above-described third embodiment, and an induced current detecting circuit using resonance similar to the above-described seventh embodiment for detecting the electro-capacitance of the capacitors.

The first and the second capacitors C1 and C2 are the same as the above-described third embodiment (see FIG. 9) and the description is omitted. The output is taken out by cables 47E and 46E, which are connected to form a closed circuit 55E. The closed circuit 55E is the same as the closed circuit 55D of the above-described seventh embodiment and the description will be omitted.

According to the present embodiment, the same effect as the seventh embodiment can be obtained. Furthermore, since the spindle state detector is independent from the housing 13, it is unlikely to be influenced by the noise and the like.

The first and the second electrodes 42 and 48 are not restricted to be insulated by the resin spacer 45, but may be insulated by forming respective electrodes with an aluminum alloy of which surface being aluminized.

(9) Modification of Embodiment

The scope of the present invention is not restricted to the above-described embodiment s but includes following modifications.

The spindle state detector 61B of the contact avoidance controller 50B according to the fifth embodiment has only one first electrode 42. However, two electrodes mutually insulated (the first and the second electrodes) may be disposed around the spindle of the air bearing machine tool to form a bridge circuit using two capacitors having the electrodes to detect the electro-capacitance signal.

Accordingly, the bearing gap state of the spindle and the housing can be detected without considering the insulation of the air bearing machine tool body and the housing, thereby further improving applicability of the contact avoidance controller.

When the first and the second electrodes 42 and 48 are used as in the third embodiment shown in FIG. 9, a displacement of the rotation axis of the axial static-air bearings 17 and 18 in using the housing 13 as an electrode can not be detected. Accordingly, it is preferable that the second electrode 48 may be also opposed to an end or a side (either protruded or lowered) of the spindle 11 orthogonally to the spindle axis to detect the displacement of the rotation axis.

The feed speed controller 91 according to the fifth and sixth embodiment deals with the voltage output signal by a hardware structure. However, another speed controller may also be adopted, where the electro-capacitance signal is taken into a computer or the like to control the relative feed speed by a software processing.

The air bearing machine tools 1 to 1C of the above-described embodiments are numerically controlled by the NC apparatus 20. However, another air bearing machine tool may also be used, where an output signal outputted by an electro-capacitance detecting means or magnetic flux detecting means is displayed by a displaying device and the spindle state is controlled by hand.

The electro-capacitance of respective capacitors is detected by the voltage balance of the bridge circuit 621 of some of the embodiments. However, other methods can be used to detect the electro-capacitance according to a magnitude of the electro-capacitance to be detected, performance of the filter and amplifier, etc.

Any specific structures and configurations and the like can be adopted as long as the object of the present invention can be attained.

What is claimed is:

1. A spindle state detector for use in a machine tool including a housing, a spindle, and an air bearing, wherein the spindle is supported by the housing, the spindle state detector using the air bearing to detect a state of a bearing gap between the spindle and the housing, comprising:

a capacitor having a pair of electrodes constituted by mutually opposing portions of the spindle and the housing; and a capacitance detector for detecting a capacitance of the capacitor, a relative displacement of the spindle and the housing being detected by a change in the capacitance of the capacitor.

2. The spindle state detector of the air bearing machine tool according to claim 1, further comprising:

an electric path connecting the spindle, a tool attached to a distal end of the spindle, a work abutted to the tool and the housing, the electric path including the capacitor therein; and a current generator for generating an electric current in the electric path, wherein the electro-capacitance detector detects the electric current in the electric path to detect the change in the capacitance of the capacitor.

3. The spindle state detector of the air bearing machine tool according to claim 2, wherein the current generator has an excitation coil including a magnetic core encircling the spindle and a winding wound to the magnetic core, and wherein the capacitance detector has a detection coil including another magnetic core encircling the spindle and another winding wound to the magnetic core.

4. The spindle state detector of the air bearing machine tool according to claim 1, further comprising a determiner for alarming when the capacitance detected by the capacitance detector exceeds a predetermined threshold value.

5. A spindle state detector for use in a machine tool including a housing, a spindle, and an air bearing, wherein the spindle is supported by the housing, the spindle state detector using the air bearing to detect a state of a bearing gap between the spindle and the housing, comprising:

- a first electrode attached to the housing, encircling the spindle by a predetermined space and electrically insulated from the housing;
- a first capacitor formed of the first electrode and a part of the spindle opposing the first electrode; and
- a capacitance detector for detecting a capacitance of the first capacitor,
- wherein a relative displacement of the spindle and the housing is detected by a change in the capacitance of the first capacitor.

6. The spindle state detector of the air bearing machine tool according to claim 5, further comprising:

- second electrode attached to the housing, encircling the spindle by a predetermined space and electrically insulated from both of the housing and the first electrode; and
- second capacitor formed of the second electrode and a portion of the spindle opposing the second electrode,
- wherein the first capacitor and the second capacitor are serially connected through the spindle, and
- wherein the capacitance detector has a bridge circuit including the first capacitor and the second capacitor.

7. The spindle state detector of the air bearing machine tool according to claim 5, wherein the housing is electrically insulated from a body of the air bearing machine tool, and the spindle state detector has a third capacitor having a pair of electrodes constituted by mutually opposing portions of the spindle and the housing,

- wherein the first capacitor and the third capacitor are serially-connected through the spindle, and
- wherein the capacitance detector has a bridge circuit including the first capacitor and the third capacitor.

8. The spindle state detector of the air bearing machine tool according to claim 5, further comprising a determiner for alarming when the capacitance detected by the capacitance detector exceeds a predetermined threshold value.

9. A spindle state detector for use in a machine tool including a housing, a spindle, and an air bearing, wherein the spindle is supported by the housing, the spindle state detector using the air bearing to detect a state of a bearing gap between the spindle and the housing, comprising:

- a magnetic core having a pair of magnetic poles constituted by mutually opposing portions of the spindle and the housing; and
- a magnetic flux detector for detecting a magnetic flux inside the magnetic core,
- wherein a relative displacement of the spindle and the housing is detected by a change in the magnetic flux of the magnetic core.

10. The spindle state detector of the air bearing machine tool according to claim 9, further comprising a magnetic flux generator for generating the magnetic flux inside the magnetic core,

- wherein an induced electromotive force generated in the magnetic flux detector in accordance with the change in magnetic flux in the magnetic core is measured to detect the change in the magnetic flux of the magnetic core.

11. The spindle state detector of the air bearing machine tool according to claim 10, wherein the magnetic flux generator has a magnetic flux generating coil including a winding wound to the magnetic core in a coiled fashion in a predetermined gap therebetween, and

- wherein the magnetic flux detector has a magnetic flux detection coil including another winding wound to the magnetic core in a coiled fashion in a predetermined gap therebetween.

12. The spindle state detector of the air bearing machine tool according to claim 9, further comprising a determiner for alarming when capacitance detected by capacitance detector exceeds a predetermined threshold value.

13. A contact avoidance controller for a machine tool including a housing, a spindle, and an air bearing for cutting a work in a way so as to avoid contact between the spindle and the housing, the machine tool having the spindle attached with a rotary tool at an end thereof and the housing for supporting the spindle by the air bearing, comprising:

- a spindle state detector for detecting a relative displacement of the spindle and the housing; and
- a feed speed controller for changing a relative feed speed of the tool and the work,
- wherein the relative feed speed of the tool and the work is changed by the feed speed controller in accordance with the relative displacement detected by the spindle state detector, thereby keeping the relative displacement within a predetermined range.

14. The contact avoidance controller of the air bearing machine tool according to claim 13,

- wherein the spindle state detector has a capacitor having a pair of electrodes constituted of mutually opposing portions of the spindle and the housing, and a capacitance detector for detecting the capacitance of the capacitor,
- wherein the relative displacement of the spindle and the housing is detected by a change in the capacitance of the capacitor.

15. The contact avoidance controller of the air bearing machine tool according to claim 14,

- wherein the feed speed controller has an acquiring section for acquiring a detection signal from the spindle state detector and a signal processor for converting the detection signal acquired from the acquiring portion and for outputting a feed speed control signal for controlling the relative feed speed, and
- wherein the signal processor has a control start deciding circuit which does not output the feed speed control signal until the detection signal sent from the spindle state detector reaches a predetermined value.

16. The contact avoidance controller of the air bearing machine tool according to claim 13,

- wherein the spindle state detector has first electrode attached to the housing, encircling the spindle by a predetermined space from and electrically insulated from the housing, first capacitor constituted of the first electrode and a portion of the spindle opposing the first electrode and a capacitance detector for detecting the capacitance of the first capacitor, and
- wherein the relative displacement of the spindle and the housing is detected by the change in the capacitance of the first capacitor.

17. The contact avoidance controller of the air bearing machine tool according to claim 13,

- wherein the spindle state detector has a magnetic core having a pair of magnetic poles constituted by opposing portions of the spindle and the housing and a magnetic flux detector for detecting the magnetic flux inside the magnetic core, and
- wherein the relative displacement of the spindle and the housing is detected by a change in the magnetic flux of the magnetic core.

* * * * *